(12) United States Patent
Kondo et al.

(10) Patent No.: US 7,113,225 B2
(45) Date of Patent: Sep. 26, 2006

(54) INFORMATION SIGNAL PROCESSING APPARATUS, PICTURE INFORMATION CONVERTING APPARATUS, AND PICTURE DISPLAYING APPARATUS

(75) Inventors: Tetsujiro Kondo, Tokyo (JP); Yasushi Tatehira, Kanagawa (JP); Nobuyuki Asakura, Tokyo (JP); Masashi Uchida, Tokyo (JP); Takuo Morimura, Kanagawa (JP); Kazutaka Ando, Kanagawa (JP); Hideo Nakaya, Kanagawa (JP); Tsutomu Watanabe, Kanagawa (JP); Satoshi Inoue, Kanagawa (JP); Wataru Niitsuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 10/177,285

(22) Filed: Jun. 20, 2002

(65) Prior Publication Data
US 2002/0180884 A1 Dec. 5, 2002

Related U.S. Application Data

(62) Division of application No. 09/358,272, filed on Jul. 21, 1999, now Pat. No. 6,483,545.

(30) Foreign Application Priority Data
Jul. 23, 1998 (JP) ............................... P10-208116

(51) Int. Cl.
*H04N 5/14* (2006.01)

(52) U.S. Cl. ...................... 348/571; 348/441; 348/448; 712/1

(58) Field of Classification Search ................ 348/571, 348/576, 578, 580, 554, 555, 722, 441, 448; 712/1, 32; H04N 5/14
See application file for complete search history.

(56) References Cited

U.S. PATENT DOCUMENTS 5,666,164 A 9/1997 Kondo et al.
(Continued)

FOREIGN PATENT DOCUMENTS

EP 0 843 475 5/1998
(Continued)

OTHER PUBLICATIONS

Patent Abstracts of Japan, vol. 1997, No. 7, Jul. 31, 1997 & JP 09 074543 A (Sony Corp), Mar. 18, 1997.
(Continued)

Primary Examiner—Michael H. Lee
(74) Attorney, Agent, or Firm—Frommer Lawrence & Haug LLP; William S. Frommer

(57) ABSTRACT

A 525i (interlace) signal can be converted into a 1050i signal or a 525p (progressive) signal. A calculating circuit generates pixels of an output picture signal with a linear estimation expression of predictive taps received from a tap selecting circuit and a coefficient received from a coefficient memory. The coefficient memory stores coefficients pre-obtained for individual classes. A class is determined by combining a spatial class corresponding to spatial class taps received from a tap selecting circuit and motion class taps received from a tap selecting circuit. A line sequential converting circuit converts a scanning line structure of an output signal of the calculating circuit 34 and obtains an output picture signal. The output picture signal is designated with a conversion method selection signal. Information corresponding to the selection signal is loaded from an information memory bank to the coefficient memory and registers.

11 Claims, 20 Drawing Sheets

U.S. PATENT DOCUMENTS

| | | |
|---|---|---|
| 5,903,481 A | 5/1999 | Kondo et al. |
| 5,912,676 A * | 6/1999 | Malladi et al. .............. 345/531 |
| 5,914,753 A * | 6/1999 | Donovan ..................... 348/441 |
| 5,946,044 A | 8/1999 | Kondo et al. |
| 5,966,183 A | 10/1999 | Kondo et al. |
| 6,124,850 A * | 9/2000 | Matsubara .................. 345/204 |

FOREIGN PATENT DOCUMENTS

| | | |
|---|---|---|
| WO | WO 96 07987 | 3/1996 |

OTHER PUBLICATIONS

Patent Abstracts of Japan, vol. 1997, No. 2, Feb. 28, 1997 & JP 08 265711 A (Sony Corp), Oct. 11, 1996.

* cited by examiner

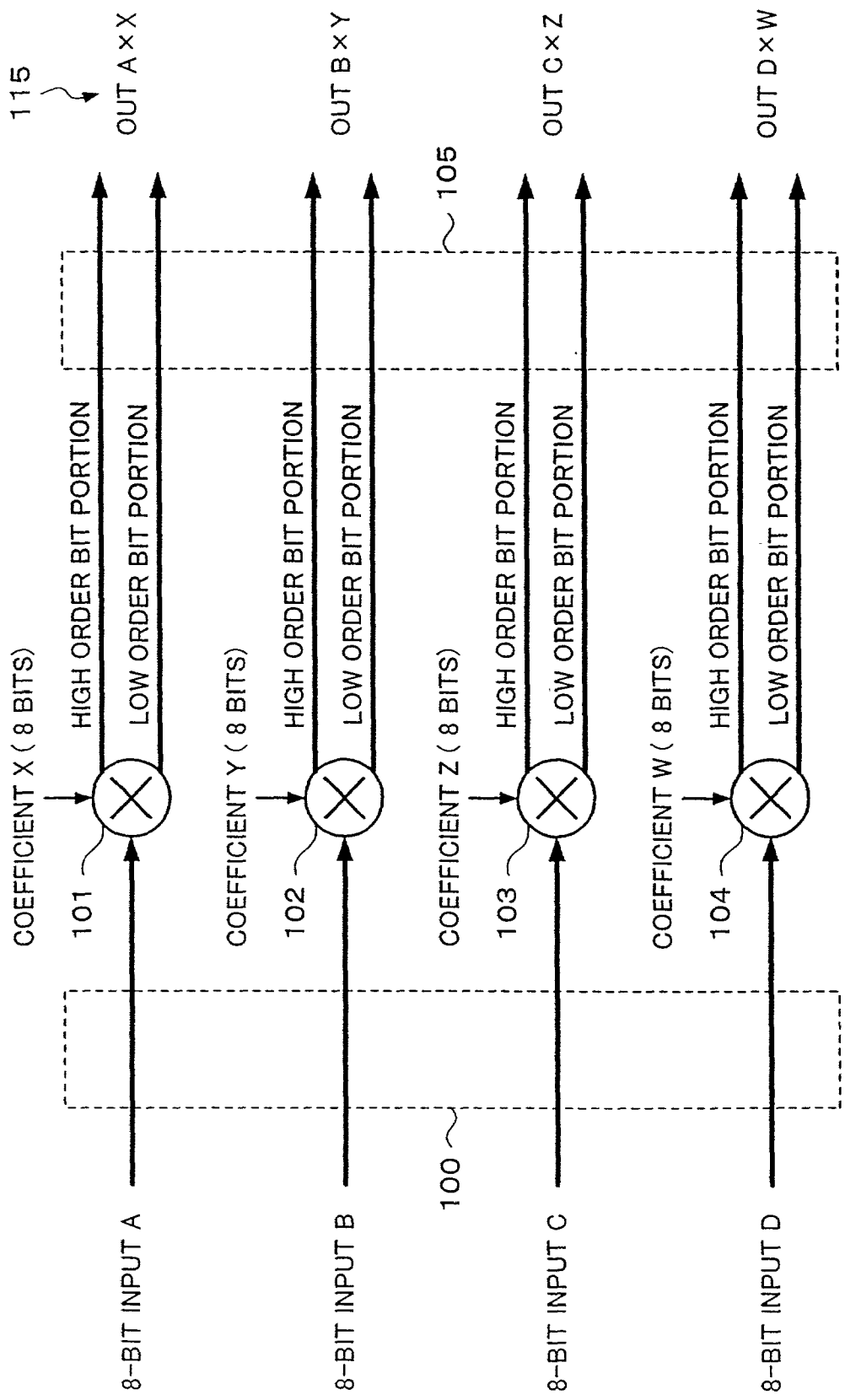

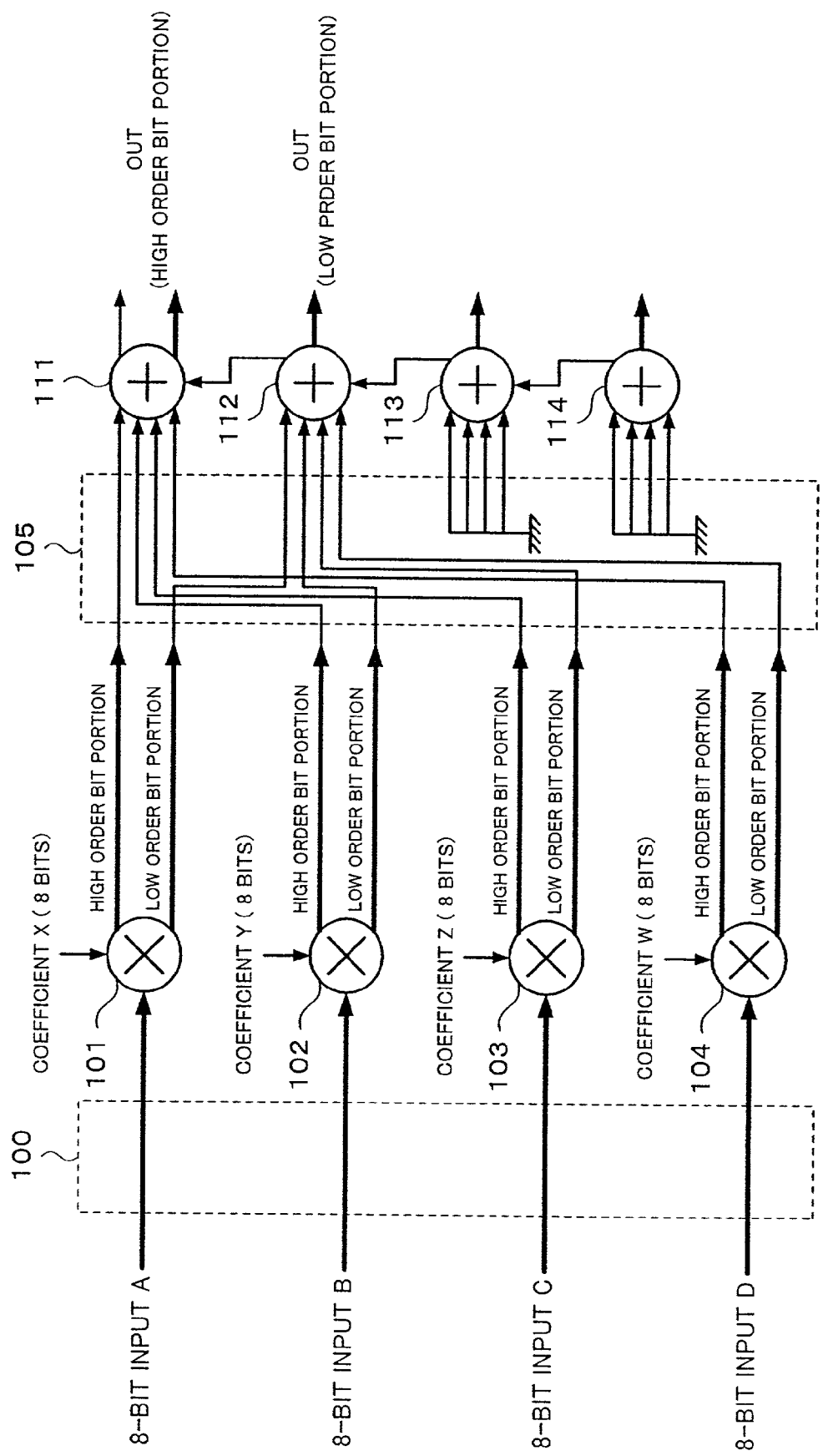

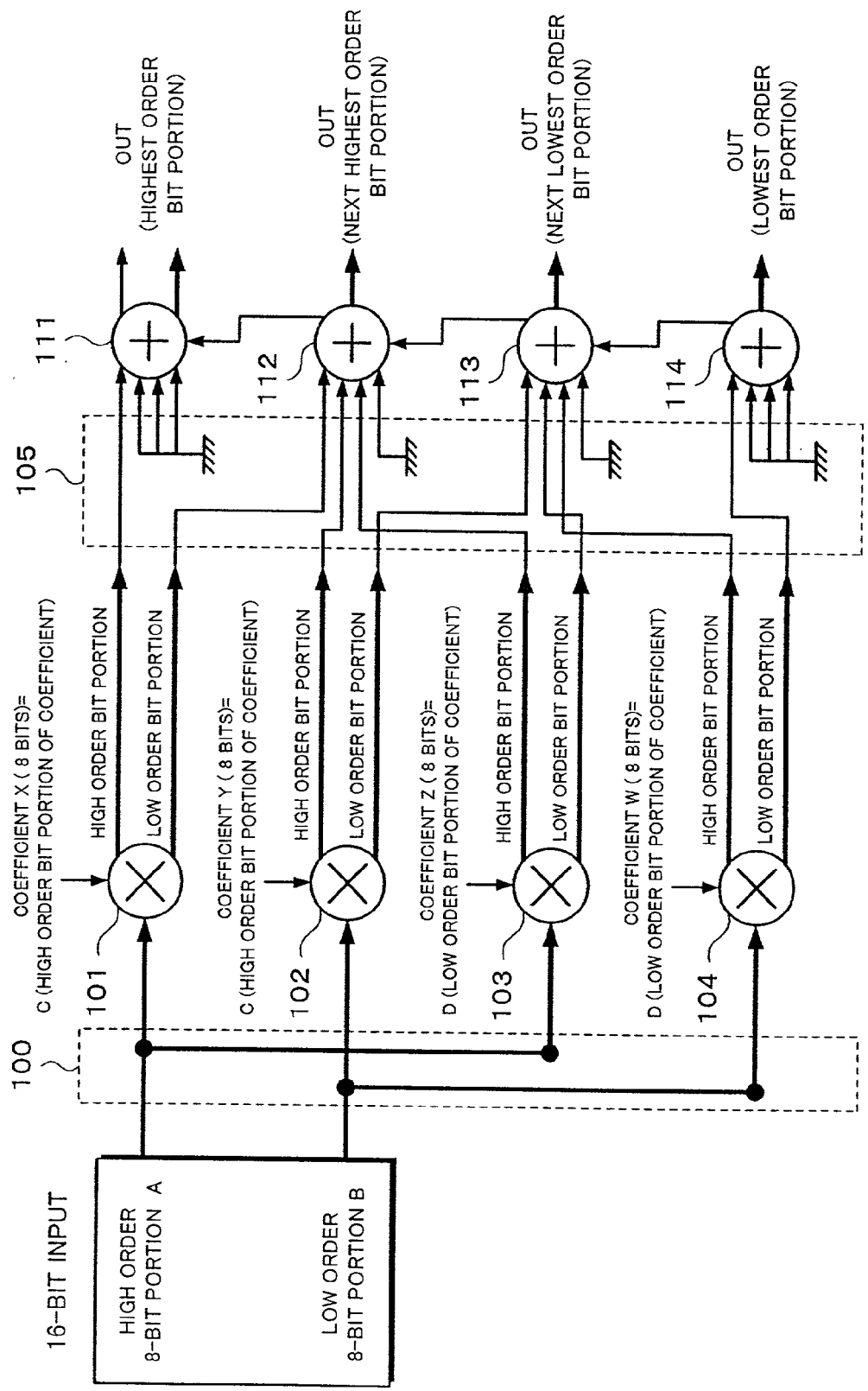

INFORMATION SIGNAL PROCESSING APPARATUS, PICTURE INFORMATION CONVERTING APPARATUS, AND PICTURE DISPLAYING APPARATUS

This is a division of U.S. application Ser. No. 09/358,272, filed Jul. 21, 1999 now U.S. Pat. No. 6,483,545.

BACKGROUND OF THE INVENTION

1. Field of the Invention

The present invention relates to an information signal processing apparatus, a picture information converting apparatus, and a picture displaying apparatus.

2. Description of the Related Art

When an output picture signal is generated with an input picture signal in such a manner that the scanning line structure of the output picture signal is different from the scanning line structure of the input picture signal, a dedicated circuit for the output picture signal may be used. When a sum-of-product calculation is performed, a plurality of calculated results may be required. To obtain a plurality of calculated results, respective calculating circuits may be switched over. However, when the circuits are switched over, since the hardware scale may become large and the circuits may become redundant.

As a practical application, when an SD signal is converted into an output signal with high quality and high resolution, circuits corresponding to the types of output signals are disposed. A relevant circuit is used corresponding to a designated output signal. In this method, the hardware scale becomes large and circuits become redundant. To obtain an output picture signal corresponding to a picture pattern of an input picture signal, a plurality of output signals are required. It is considered that an interlace SD (standard definition) picture signal having 525 scanning lines is converted into an interlace HD (high definition) picture signal having 1050 scanning lines. Since the number of scanning lines is doubled, in the case of a natural picture, an output picture signal with high quality and high resolution is obtained. However, since the output picture signal is an interlace picture signal, in the case of a graphic picture, a line flicker becomes conspicuous. Thus, corresponding to the type of an input picture signal, the scanning line structure of an output picture signal should be switched over.

As a known method for removing a line flicker component, an interlace signal is converted into a progressive signal. However, in this method, an input signal is linear-interpolated and an interpolated signal is obtained. Thus, the resolution of the output signal cannot be improved against that of the input signal. In addition, when an interpolating method (for a still picture process or a moving picture process) is switched over corresponding to the detected result of a motion, the difference of resolution between the original signal and the interpolated signal becomes large. In particular, when a motion is incorrectly detected, the picture quality largely deteriorates.

As related inventions of the present invention, the applicant of the present invention has obtained the following US patents.

1. U.S. Pat. No. 5,379,072: Digital Video Signal Resolution Converting Apparatus 2. U.S. Pat. No. 5,666,164: Image Signal Converting Apparatus

OBJECTS AND SUMMARY OF THE INVENTION

An object of the present invention is to prevent a hardware scale from increasing against a plurality of circuit blocks being switched over. In other words, an object of the present invention is to provide an information signal processing apparatus that allows the operation state of a signal processing circuit thereof to be varied corresponding to an external operation condition setup signal. Another object of the present invention is to provide a picture information converting apparatus and a picture displaying apparatus that allow an output picture signal with a designated scanning line structure to be obtained.

A first aspect of the present invention is an information signal processing apparatus, comprising a signal processing circuit for performing a predetermined process for an input information signal, a control signal source, disposed outside the signal processing circuit, for supplying a control signal to the signal processing circuit, an operation condition setting circuit for generating an operation condition setup signal for the signal processing circuit corresponding to the control signal, and a signal varying circuit for varying an operation state of the signal processing circuit corresponding to the control signal.

The signal processing circuit may have at least two processing portions, the signal processing portion causing the operation state of at least one (referred to as designated processing portion) of the processing portions to vary corresponding to the operation condition setup signal, the operation state of the other process portion being varied corresponding to the variation of the operation state of the designated process portion.

A second aspect of the present invention is a picture information converting apparatus for generating a plurality of output picture signals having different scanning line structures with an input picture signal, the apparatus comprising a first data selecting means for selecting a plurality of second pixels of the input picture signal present in the vicinity of a first pixel generated as an output picture signal, a second data selecting means for selecting a plurality of third pixels of the input picture signal present in the vicinity of the first pixel generated as the output picture signal, a memory means for storing a pre-obtained estimation expression coefficient, a pixel value generating means for generating the first pixel with the second pixels selected by the first data selecting means and a linear estimation expression of the estimation expression coefficient, a class determining means for generating class information corresponding to the third pixels selected by the second data selecting means and supplying the estimation expression coefficient to the pixel value generating means corresponding to the class information, a scanning line structure converting means, connected to the pixel value generating means, for converting a conversion picture to a designated scanning line structure, and a controlling means for receiving a control signal that designates a scanning line structure of the output picture signal and switching over the second pixels and the third pixels selected by the estimation expression coefficient, the first data selecting means, and the second data selecting means corresponding to the control signal.

A third aspect of the present invention is a picture displaying apparatus for receiving an input picture signal and displaying the input picture signal to a displaying unit, the apparatus comprising a picture information converting unit, disposed between an input picture signal source and the display unit, for generating a plurality of output picture signals having different scanning line structures with the input picture signal, wherein the picture information converting unit comprises a first tap selecting means for selecting a plurality of second pixels of the input picture signal present in the vicinity of a first pixel generated as an output picture signal, a second tap selecting means for selecting a plurality of third pixels of the input picture signal present in the vicinity of the first pixel generated as the output picture signal, a memory means for storing a pre-obtained estimation expression coefficient, a pixel value generating means for generating the first pixel with the second pixels selected by the first tap selecting means and a linear estimation expression of the estimation expression coefficient, a class determining means for generating class information corresponding to the third pixels selected by the second tap selecting means and supplying the estimation expression coefficient corresponding to the class information to the pixel value generating means, a scanning line structure converting means, connected to the pixel value generating means, for converting a conversion picture to a designated scanning line structure, and a controlling means for receiving a control signal that designates a conversion method and switching over the second pixels and third pixels selected by the estimation expression coefficient, the first tap selecting means, and the second tap selecting means corresponding to the control signal.

According to the present invention, since one signal processing circuit that accomplishes a plurality of signal processing functions corresponding to an operation condition setup signal, the hardware scale can be reduced in comparison with a structure of which a plurality of circuits are switched. In the picture information converting apparatus according to the present invention, an input picture signal can be converted into a designated one of a plurality of output picture signals having different scanning line structures. Thus, an input picture signal can be converted into an output picture corresponding to a picture pattern of the input picture signal. In this case, the hardware scale can be prevented from becoming large. In addition, according to the present invention, since pixel values are generated with an estimation prediction expression that is optimum in each class. Thus, a still picture and a moving picture can be output with high picture quality.

The above, and other, objects, features and advantage of the present invention will become readily apparent from the following detailed description thereof which is to be read in connection with the accompanying drawings.

BRIEF DESCRIPTION OF THE DRAWINGS

FIG. 18 is a block diagram showing a first function of the third embodiment of the present invention;

FIG. 19 is a block diagram showing a second function of the third embodiment of the present invention; and FIG. 20 is a block diagram showing a third function of the third embodiment of the present invention.

DETAILED DESCRIPTION OF THE PREFERRED EMBODIMENTS

Figure 1:
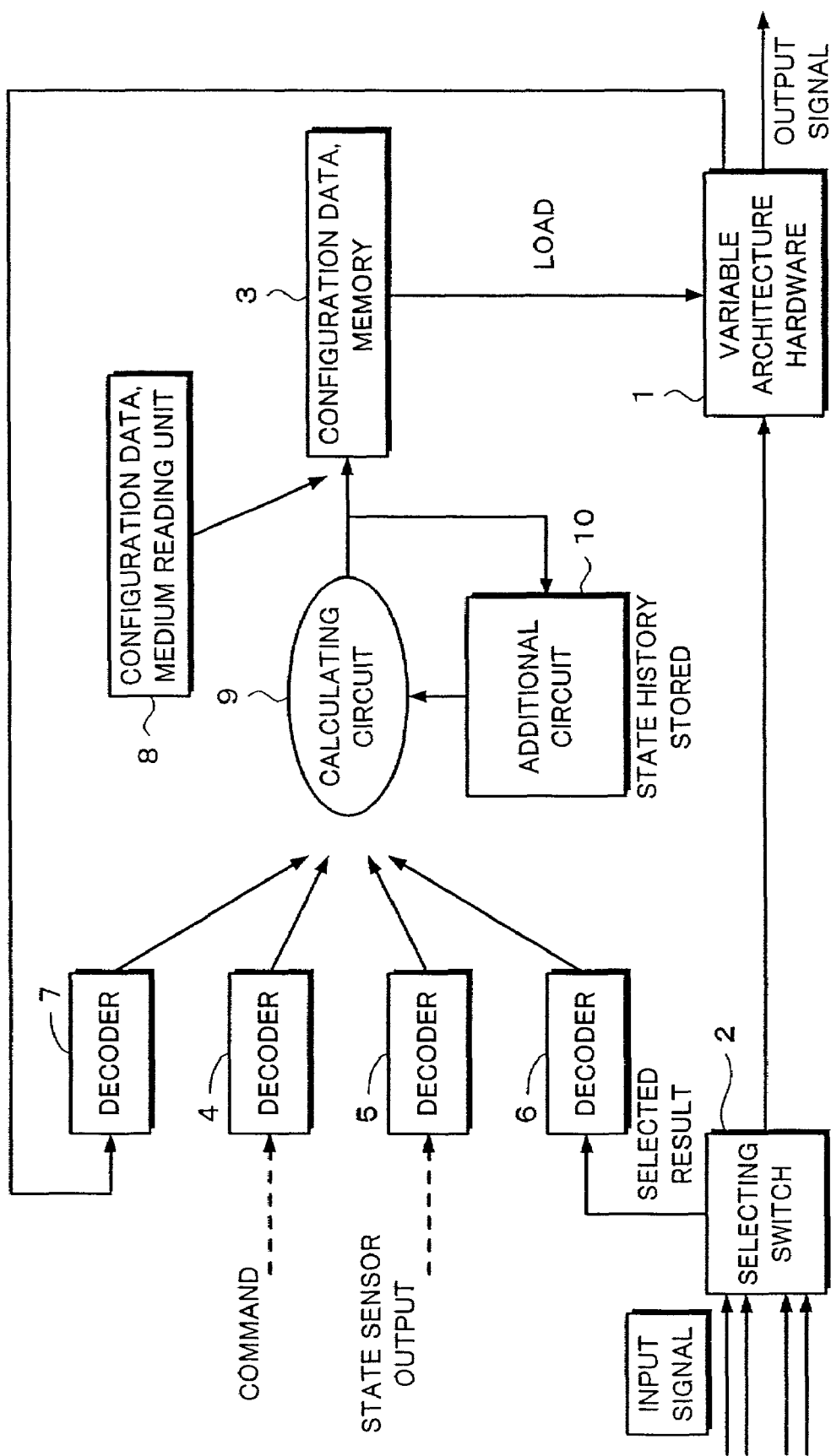
FIG. 1 is a block diagram for explaining the basic structure and operation of the present invention.

Before explaining embodiments of the present invention, with reference to FIG. 1, the basic structure and operation of an information signal processing apparatus will be described. In FIG. 1, reference numeral 1 is variable architecture hardware. The variable architecture hardware 1 is a signal processing circuit that accomplishes a plurality of signal processing functions without need to change the basic hardware structure. The variable architecture hardware 1 has at least two processing portions 2. The variable architecture hardware 1 can vary the inner signal path, tap structure, calculation process, and coefficient of sum-of-product calculation. An input signal is supplied to the variable architecture hardware 1 through a selecting switch 2.

Functions of the variable architecture hardware 1 are set corresponding to an operation condition setup signal (referred to as configuration data). Configuration data corresponding to a desired function is loaded from a memory 3 to a register of the variable architecture hardware 1. When the operation state of one processing portion (referred to as designated processing portion) of a plurality of processing portions of the variable architecture hardware 1 is varied corresponding to the configuration data, the operation states of the remaining processing portions (referred to as remaining processing portions) are varied corresponding to the variation of the operation state of the designated processing portion. The configuration data stored in the memory 3 is generated in one of the following methods.

As a first method for generating configuration data, a command corresponding to a user's switch operation is decoded by a decoder 4. As a second method for generating configuration data, a state sensor output signal (for example, the detected result of the characteristic of an input signal) is decoded by a decoder 5. As a third method for generating configuration data, the selected result of an input signal selecting switch 2 is decoded by a decoder 6. As a fourth method for generating configuration data, a signal generated by the variable architecture hardware 1 is decoded by a decoder 7.

When a plurality of types of configuration data are generated, a calculating circuit 9 may calculate the plurality of types of configuration data and store the calculated result to the memory 3. In association with the calculating circuit 9, an addition circuit 10 that stores a state history is disposed. A simple example of the calculating circuit 9 is a selecting circuit that selects one of the plurality of types of configuration data.

The information signal processing apparatus shown in FIG. 1 generates configuration data corresponding to a command or the like and causes the variable architecture hardware 1 to accomplish a function corresponding to the generated configuration data. Thus, it is not necessary to provide circuits corresponding to the plurality of signal processing functions. Consequently, the hardware scale can be reduced.

Next, a picture information converting apparatus according to a first embodiment of the present invention will be described. In the picture information converting apparatus according to the first embodiment, an input interlace picture signal having 525 scanning lines (hereinafter referred to as 525p signal) is converted into an output picture signal with a higher resolution than the input signal. In this example, one of two types of picture signals can be selected. The first output picture signal is an interlace picture signal having 1050 scanning lines (hereinafter referred to as 1050i signal). The second output picture signal is a progressive (non-interlace) picture signal having 525 scanning lines (hereinafter referred to as 525p signal). In these output picture signals, the number of pixels in the horizontal direction is twice that of the input picture signal.

One of two types of picture signals with different resolutions is selectively output so that a good signal conversion result is obtained corresponding to the characteristic of an input picture signal. Since the 1050i signal is an interlace signal, it is subject to a line flicker. Thus, when an input picture signal is a natural picture, a output picture signal with high quality can be obtained. However, when an input picture signal is graphic information, a line flicker is conspicuous. In other words, when an input picture signal is graphic information, it is preferable to output a progressive picture signal of which a line flicker is not conspicuous. In such a manner, corresponding to a picture pattern of an input picture signal, one of the 1050i signal and the 525p signal can be selected. A command for selecting one of the 1050i signal and the 525p signal may be input by the user or automatically input corresponding to the input picture signal.

Figure 2:
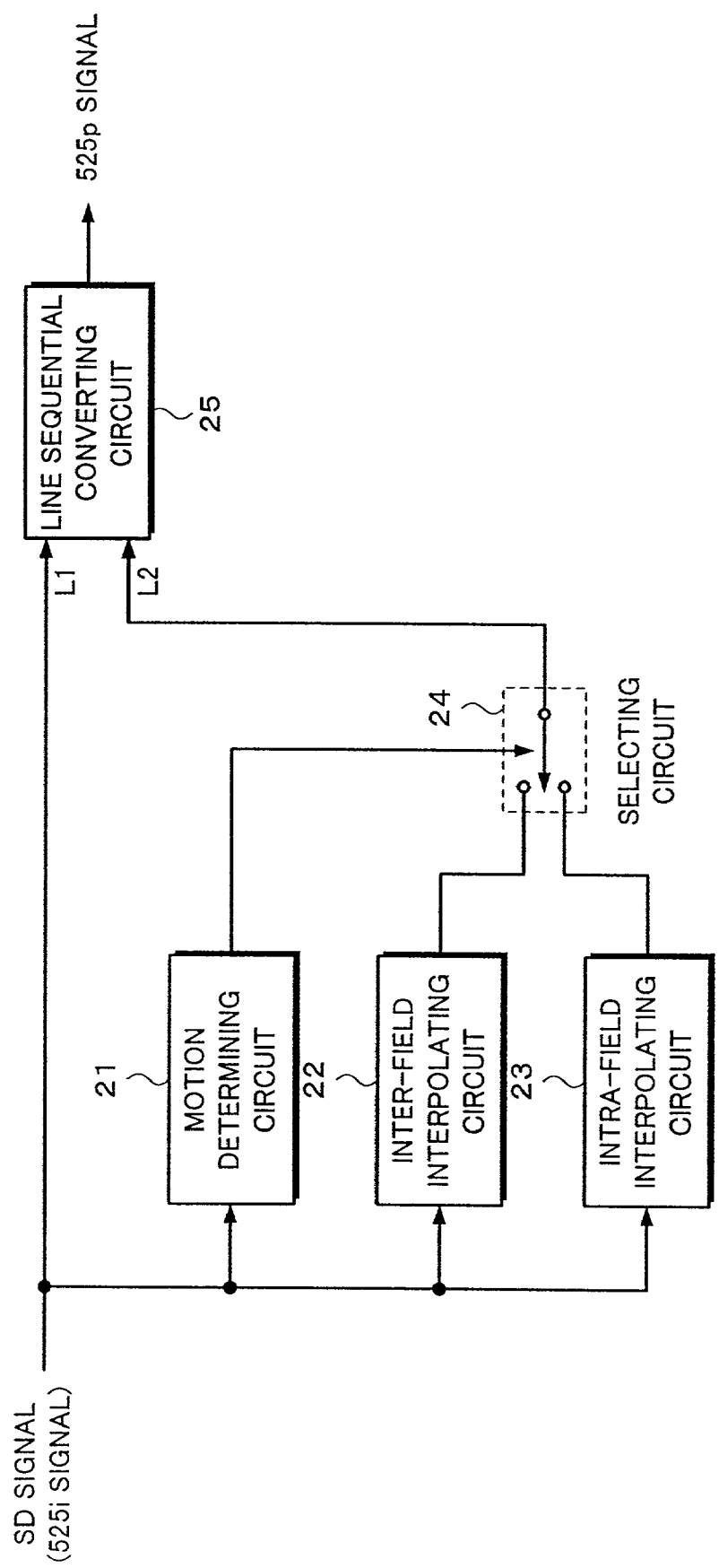
FIG. 2 is a block diagram showing an example of the structure of a picture information converting apparatus according to the present invention.

In the first embodiment, the resolution of an input picture signal is improved by the class categorization adaptive process proposed by the applicant of the present invention. In a conventional image information converting apparatus, a signal with high resolution is generated by an interpolating process. Conventionally, as shown in FIG. 2, an input 525i SD (Standard Definition) signal is supplied to a motion determining circuit 21, an inter-frame interpolating circuit 22, and an intra-field interpolating circuit 23. One of output signals of the interpolating circuits 22 and 23 is selected by a switching circuit 24. The selected signal is supplied to a line sequential converting circuit 25. The line sequential converting circuit 25 receives line data L1 of the SD signal and line data L2 received from the switching circuit 24 and performs a horizontal scanning line double speed process. The line sequential converting circuit 25 outputs a 525p signal.

When the determined result of the motion determining circuit 21 is a still picture, the switching circuit 24 selects the output signal of the inter-field interpolating circuit 22. When the determined result of the motion determining circuit 21 is a moving picture, the switching circuit 24 selects the output signal of the inter-field interpolating circuit 23. For example, the inter-field interpolating circuit 22 generates a new line signal with the preceding line signal. The intra-field interpolating circuit 23 generates a new line signal with the average value of adjacent line signals of the same field.

However, in the conventional picture information converting apparatus, since an interpolating process is performed in the vertical direction with an SD signal, the resolution of the output signal is not higher than that of the input SD signal. In addition, when an original line is switched over to an interpolated-line, the difference of resolutions becomes large. On the other hand, in the class categorization adaptive process according to the present invention, picture signal levels of an input picture signal are categorized as classes corresponding to a three-dimensional (time-space) distribution thereof. Predictive coefficients pre-learnt corresponding to individual classes are stored to a storing means. An optimumly estimated value is calculated corresponding to a predictive expression. Thus, the resolution of the output signal can becomes higher than that of the input signal.

Figure 3:
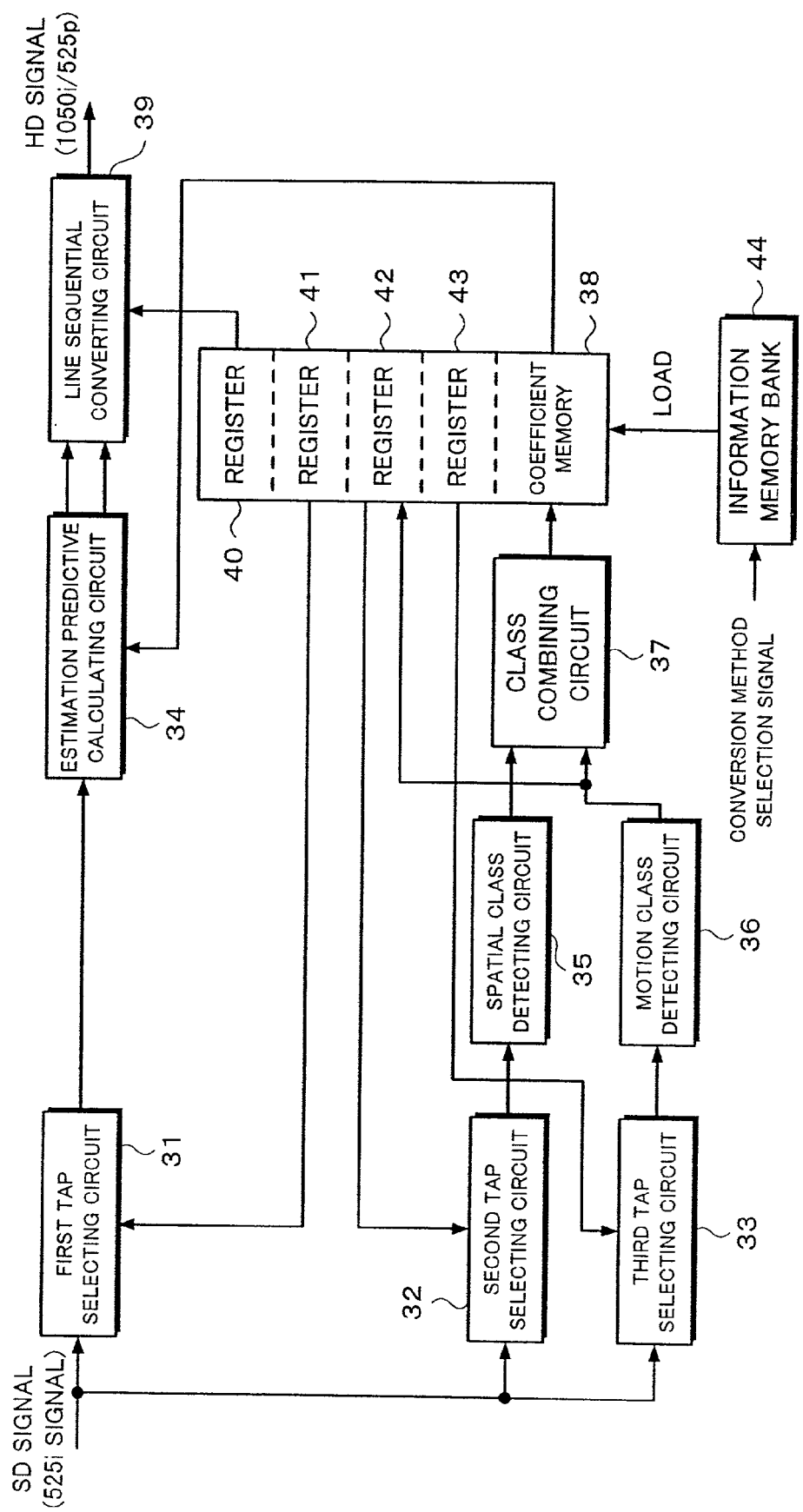
FIG. 3 is a block diagram showing the structure of a picture information converting apparatus according to a first embodiment of the present invention.

In this technique, when HD (High Definition) pixels are generated, SD pixels present in the vicinity thereof are categorized as classes. Predictive coefficients are pre-leant corresponding to the individual classes. Thus, HD pixels closer to real values are obtained. FIG. 3 shows the structure of the picture signal converting apparatus according to the first embodiment of the present invention. The picture signal converting apparatus according to the first embodiment converts an input SD signal into an output HD signal corresponding to such a technique.

In FIG. 3, an input SD signal (525i signal) is supplied to a first tap selecting circuit 31, a second tap selecting circuit 32, and a third tap selecting circuit 33. The first tap selecting circuit 31 selects SD pixels that are used for predicting HD pixels (the SD pixels are referred to as predictive taps). The second tap selecting circuit 32 selects SD pixels used to categorize classes corresponding to a distribution pattern of levels of SD pixels present in the vicinity of HD pixels to be generated (hereinafter, the SD pixels are referred to as spatial class taps). The third tap selecting circuit 33 selects SD pixels used to categorize classes of motion corresponding to SD pixels present in the vicinity of HD pixels to be generated (hereinafter the SD pixels are referred to as motion class taps). When a spatial class is determined with SD pixels present in a plurality of fields, the spatial class contains motion information.

Predictive taps selected by the first tap selecting circuit 31 are supplied to an estimation predictive calculating circuit 34. Spatial class taps selected by the second tap selecting circuit 32 are supplied to a spatial class detecting circuit 35.

The spatial class detecting circuit 35 detects a spatial class. The detected spatial class is supplied to a class combining circuit 37. Motion class taps selected by the third tap selecting circuit 33 are supplied to a motion class detecting circuit 36. The motion class detecting circuit 36 detects a motion class. The detected motion class is supplied to a class combining circuit 37. The class combining circuit 37 combines the spatial class and the motion class and generates a final class code.

The class code is supplied as an address to a coefficient memory 38. Coefficient data corresponding to the class code is read from the coefficient memory 38. The coefficient data and the predictive taps are supplied to the estimation predictive calculating circuit 34. The estimation predictive calculating circuit 34 calculates HD data (data of an 1050i signal or data of a 525p signal) corresponding to SD data using a linear estimation expression of the predictive taps (pixels of the 525i signal) and the coefficient data. Output signals (line data L1 and L2) of the estimation predictive calculating circuit 34 are supplied to a line sequential converting circuit 39. The line sequential converting circuit 39 has a line memory that sequentially outputs the line data L1 and L2 of the estimation predictive calculating circuit 34. The line sequential converting circuit 39 outputs an HD signal (a 1050i signal or a 525p signal).

The output HD signal is supplied to a CRT displaying unit (not shown). Regardless of whether the output HD signal is a 1050i signal or a 525p signal, the CRT displaying unit can display the selected signal using a relevant synchronizing system that is switched over corresponding to the selected HD signal. The input SD signal is a broadcast signal or a reproduction signal of a reproducing unit such as a VCR. Thus, the CRT displaying unit can reproduce a picture with a higher resolution. The picture signal processing apparatus according to the first embodiment of the present invention can be built in a television receiver.

Data of a 1050i signal to be generated is line data L1 close to a line of a 525i signal and line data L2 far therefrom. Data of a 525p signal is line data L1 at the same position as a line of a 525i signal and line data L2 far therefrom. A process for generating the line data L1 is referred to as mode 1. A process for generating the line data L2 is referred to as mode 2. The number of pixels in the horizontal direction is doubled. Thus, the line data L1 and the line data L2 do not represent particular lines. Instead, the line data L1 represents a line of pixel data generated in the mode 1, whereas the line data L2 represents a line of pixel data generated in the mode 2.

Figure 4:
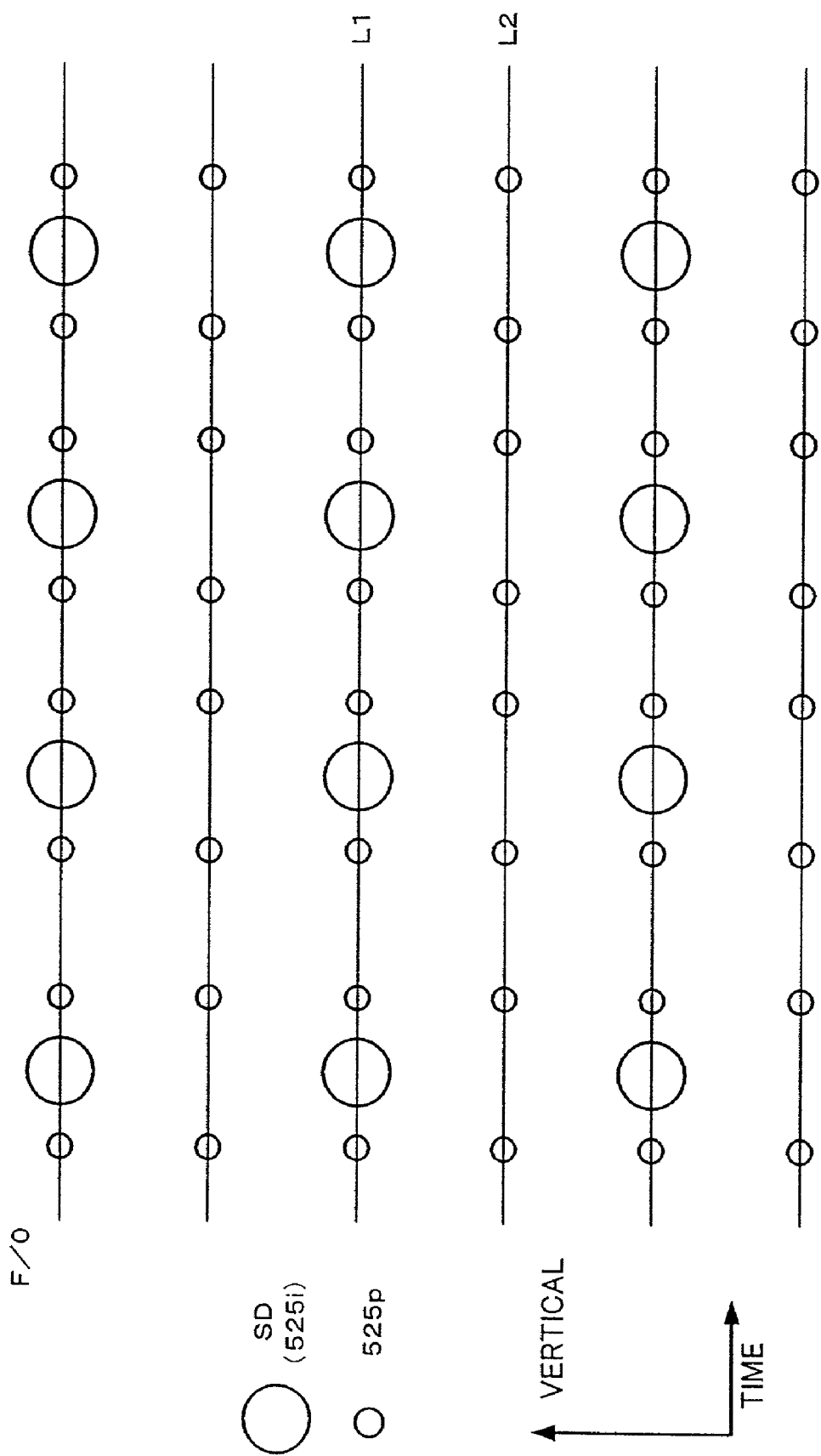
FIG. 4 is a schematic diagram for explaining the relation between positions of SD pixels and positions of 525p pixels.

FIG. 4 is an enlarged view of a part of a picture of one field. FIG. 4 shows an arrangement of pixels of a 525i signal and a 525p signal. In FIG. 4, large dots represent pixels of the 525i signal, whereas small dots represent pixels of the 525p signal. This relation applies to the other drawings. FIG. 4 shows an arrangement of pixels of an odd (O) field of a particular frame (F). In another field (even field), the lines of the 525i signal spatially deviate from the those against the odd field shown in FIG. 4. As is clear from FIG. 4, the picture signal converting apparatus according to the first embodiment generates line data L1 and line data L2. The line data L1 is present at the same position as, each line of the 525i signal. The line data L2 is present at the center position of two vertically adjacent lines of the 525i signal. The number of pixels in the horizontal direction of each line of the 525p signal is twice that of the 525i signal. Thus, data of four pixels of the 525p signal is generated at a time.

Figure 5:
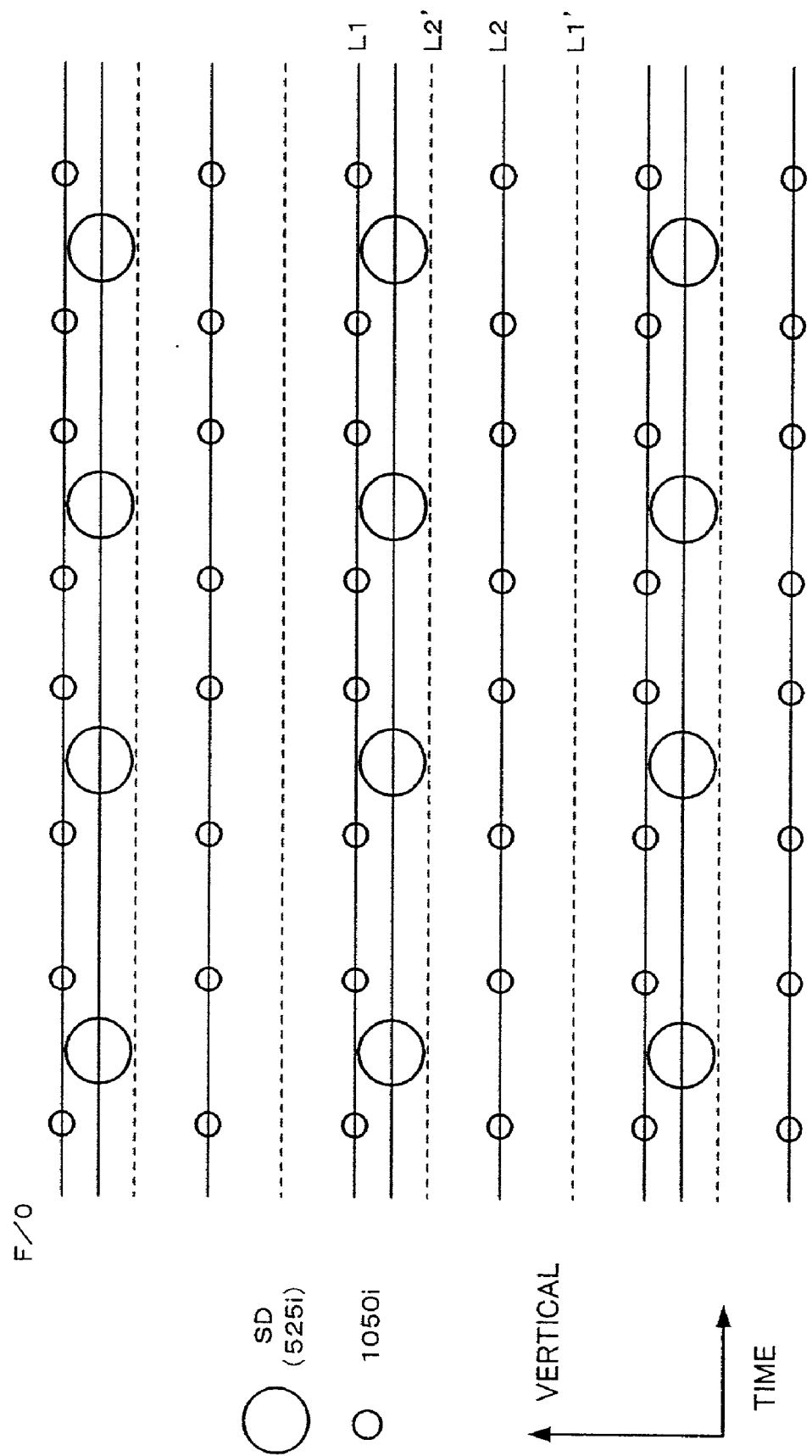
FIG. 5 is a schematic diagram for explaining the relation between positions of SD pixels and positions of 1050i pixels.

FIG. 5 is an enlarged view of a part of a picture of one field. FIG. 5 shows an arrangement of pixels of a 525i signal and a 1050i signal. In FIG. 5, large dots represent pixels of the 525i signal, whereas small dots represent pixels of the 1050i signal. This relation applies to the other drawings. FIG. 5 shows an arrangement of pixels of an odd field (o) of a particular frame (F). In FIG. 5, lines of the other field (namely, an even (e) field) are denoted by dotted lines. In the other field, pixels of line data L1' and L2' are generated. As is clear from FIG. 5, the picture signal converting apparatus according to the first embodiment generates line data L1 and line data L2 with a line of the 525i signal. The line data L1 and the line data L2 have an interlace structure. The number of lines of the 525i signal is twice that of the 1050i signal. In addition, the number of pixels in the horizontal direction of the output 1050i signal is twice that of the input 525i signal. Consequently, data of four pixels of the 1050i signal is generated at a time.

Figure 6:
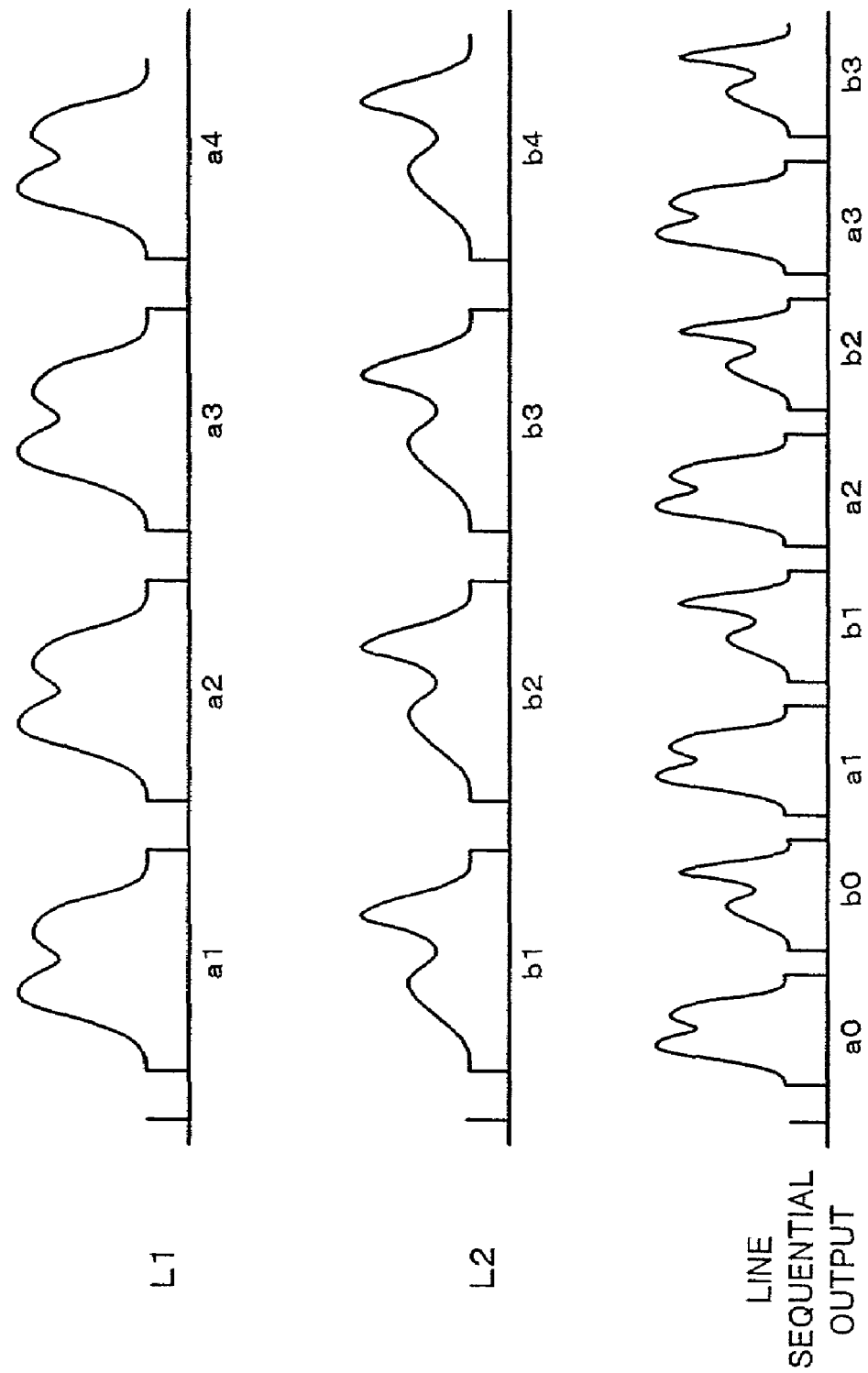
FIG. 6 is a schematic diagram showing waveforms for explaining the operation of a line sequential converting circuit.

Since the estimation predictive calculating circuit 34 generates a 525p signal or a 1050i signal with a 525i signal, the horizontal period of the output signal is the same as that of the input signal. The line sequential converting circuit 39 performs a line double speed process for doubling the horizontal period so as to line sequence the line data L1 and L2. FIG. 6 shows analog waveforms in the line double speed process for outputting a 525p signal. As described above, the estimation predictive calculating circuit 34 generates line data L1 and L2. The line data L1 contains lines a1, a2, a3, and so forth arranged in the order. The line data L2 contains lines b1, b2, b3, and so forth contained in the order. The line sequential converting circuit 39 compresses data of each line in the time axis direction by ½. The line sequential converting circuit 39 alternately selects the compressed data of each line and generates line sequential data (a0, b0, a1, b1, and so forth). To output a 1050i signal, the line sequential converting circuit 39 generates output data that satisfies the interlace relation. Thus, the operation of the line sequential converting circuit 39 is switched over corresponding to switch information that depends on whether the output signal is a 525p signal or a 1050i signal. The switch information is stored in a register 40.

In the first embodiment, predictive taps are selected by the first tap selecting circuit 31 corresponding to first tap position information stored in a register 41. Spatial class taps are selected by the second tap selecting circuit 32 corresponding to second tap position information stored in a register 42. Motion class taps are selected by the third tap selecting circuit 33 corresponding to third tap position information stored in a register 43. For example, the first tap position information, the second tap position information, and the third tap position information are designated to a plurality of numbered SD pixels.

The coefficient data stored to the coefficient memory 38, the control signal for designating a scanning line structure stored to the register 40, and the tap position information stored to the registers 41, 42, and 43 are loaded from an information memory bank 44. The information memory bank 44 pre-stores data that is supplied to the coefficient memory 38 and the registers 40 to 43. A conversion method selection signal is supplied to the information memory bank 44. The information memory bank 44 selects information to be loaded to the coefficient memory 38 and the registers 40 to 43 corresponding to the selection signal. In the first embodiment, the user selects one of a 525p signal and a 1050i signal corresponding to a picture pattern. The conversion method selection signal is generated corresponding to the user's selection. Alternatively, a picture pattern of an input picture signal may be detected. Corresponding to the detected result, the selection signal may be automatically generated.

It should be noted that the present invention is not limited to the above-described 525p and 1050i signals. Instead, a 1050p signal may be output. In addition, the number of scanning lines is not limited to 525 and 1050.

Figure 7:
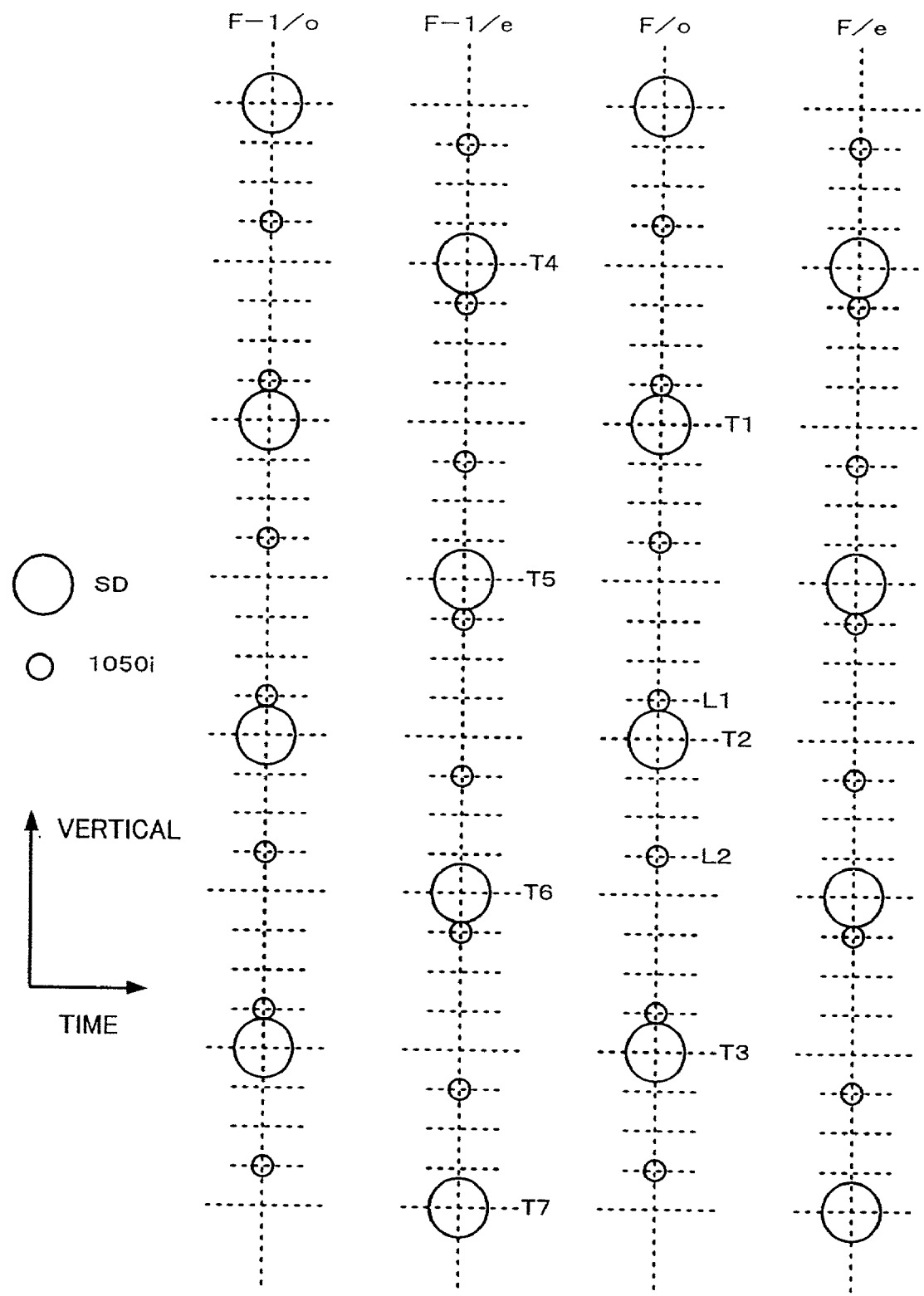
FIG. 7 is a schematic diagram showing the relation between positions of SD pixels and positions of 1050i pixels and an example of spatial class taps.
Figure 8:
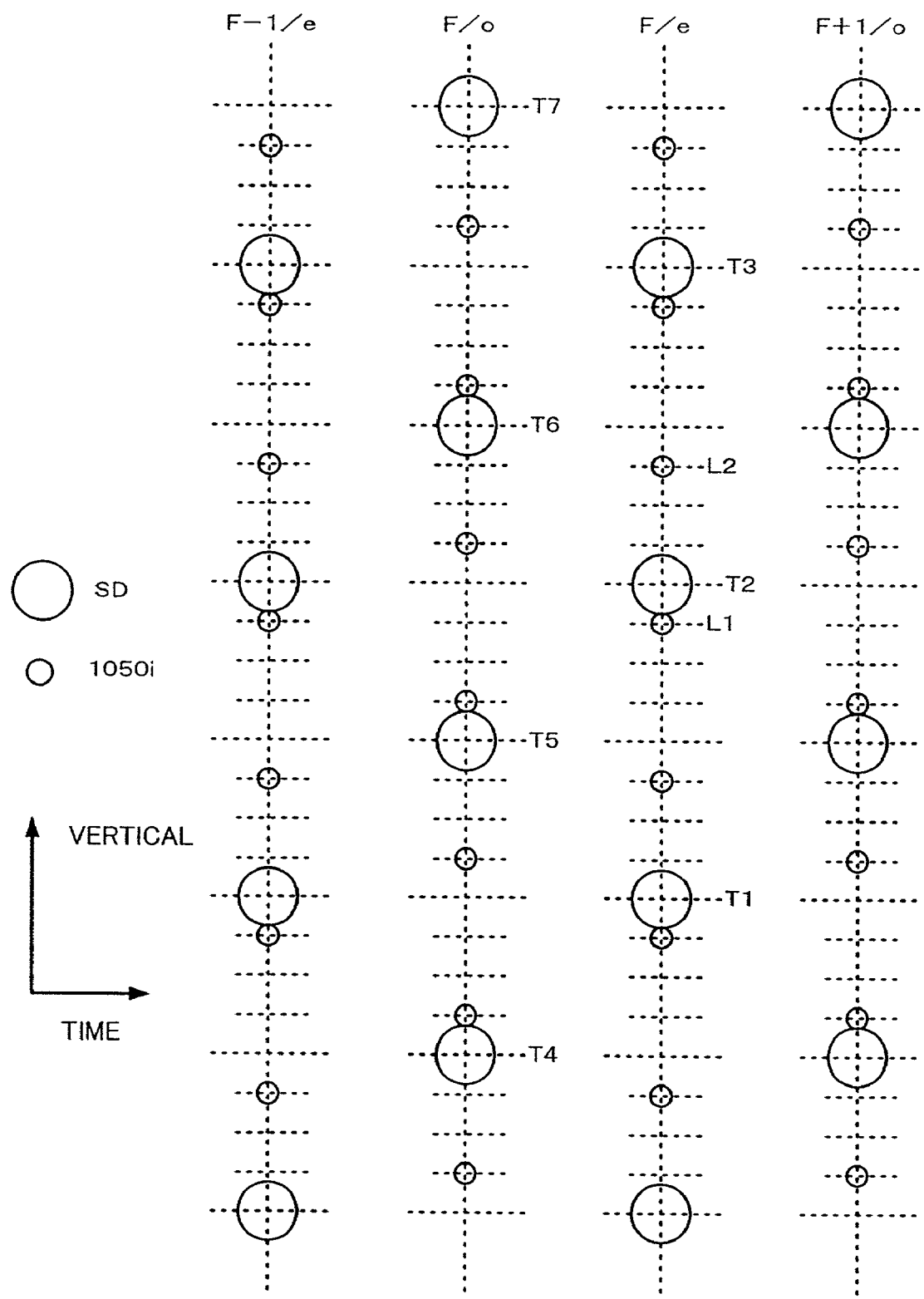
FIG. 8 is a schematic diagram showing the relation between positions of SD pixels and positions of 1050i pixels and an example of spatial class taps.

Next, real examples of the above-described spatial class taps and motion class taps will be described. FIGS. 7 and 8 show taps (SD pixels) selected by the second tap selecting circuit 32 in the case that a 525i signal is converted into a 1050i signal. FIGS. 7 and 8 show arrangements of pixels in the vertical direction of an odd field of a frame F-1 (this field is denoted by F-1/o), an even field thereof (this field is denoted by F-1/e), an odd field of a frame F (this field is denoted by F/o), and an even field thereof (this field is denoted by F/e) that are chronologically sequential.

As shown in FIG. 7, spatial class taps for predicting line data L1 and line data L2 of the field F/o are contained in the field F/o. In this case, as spatial class taps, SD pixels T1, T2, and T3 of a 525i signal in the vicinity of pixels of a 1025i signal to be generated and SD pixels T4, T5, T6, and T7 of the preceding field F-1/e are used. When the line data L1 and the line data L2 of the field F/e are predicted, as shown in FIG. 8, as spatial class taps, SD pixels T1, T2, and T3 of the field F/e in the vicinity of pixels of a 1025i signal to be generated and SD pixels T4, T5, T6, and T7 of the preceding field F/o are used. In mode 1 for predicting pixels of the line data L1, the SD pixel T7 may not be selected as a class tap. In mode 2 for predicting pixels of the line data L2, the SD pixel T4 may not be selected as a class tap.

Figure 9:
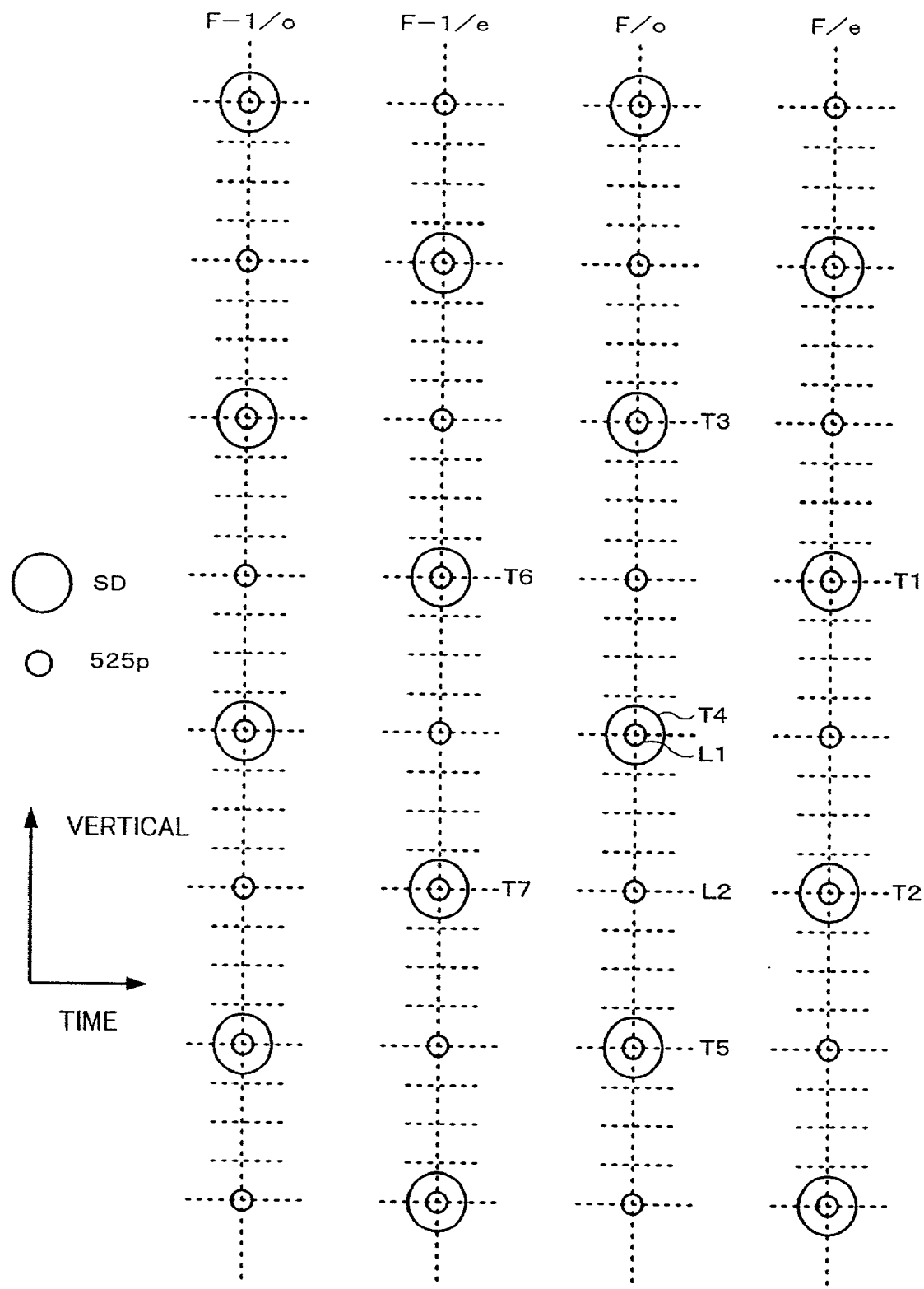
FIG. 9 is a schematic diagram showing the relation between positions of SD pixels and positions of 525p pixels and an example of spatial class taps.
Figure 10:
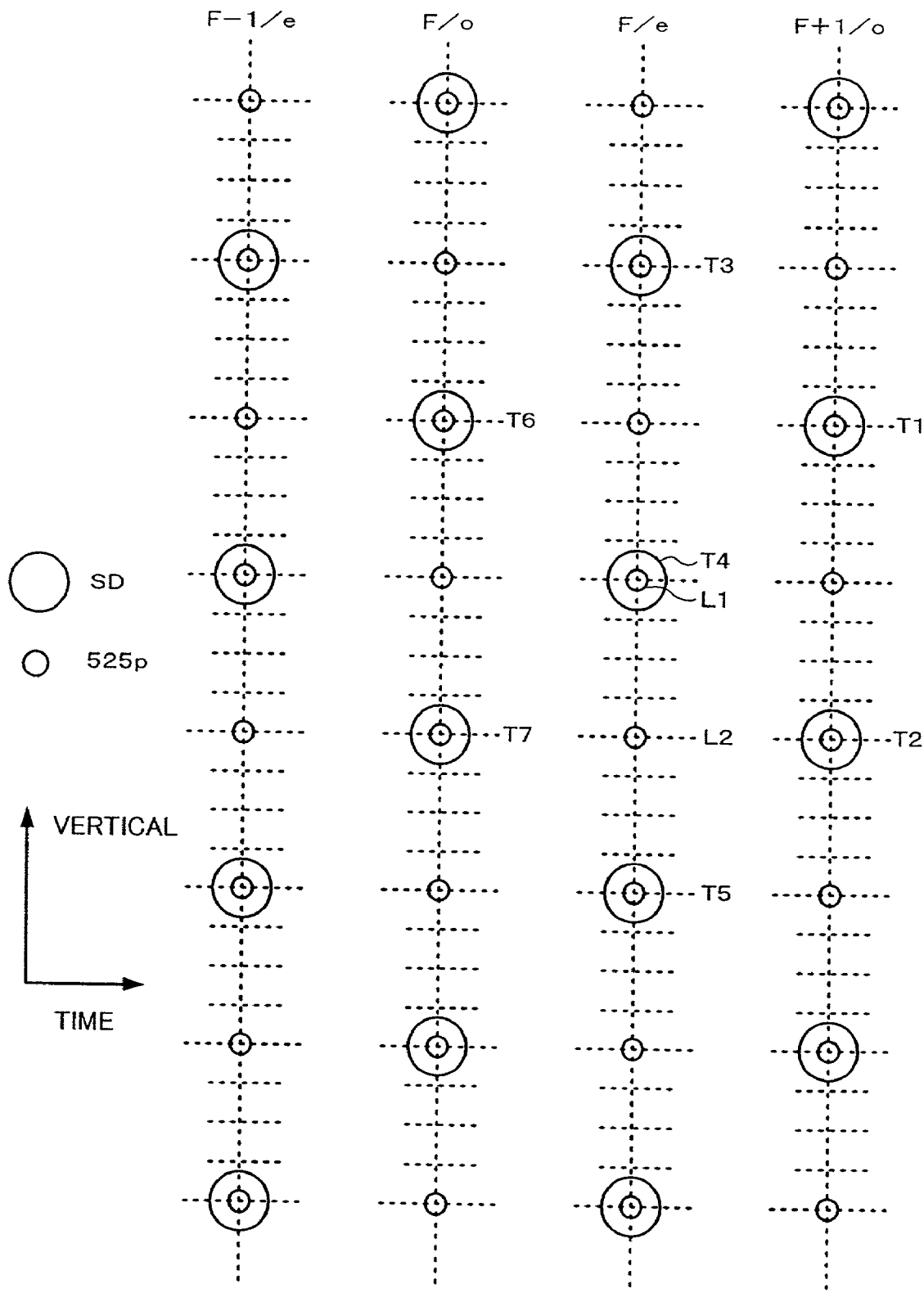
FIG. 10 is a schematic diagram showing the relation between positions of SD pixels and positions of 525p pixels and an example of spatial class taps.

FIGS. 9 and 10 show taps (SD pixels) selected by the second tap selecting circuit 32 in the case that a 525i signal is converted into a 525p signal. FIGS. 9 and 10 show arrangements of pixels in the vertical direction of an odd field of a frame F-1 (this field is denoted by F-1/o), an even field thereof (this field is denoted by F-1/e), an odd field of a frame (this field is denoted by F/o), and an even field thereof (this field is denoted by F/e) that are chronologically sequential.

As shown in FIG. 9, as spatial class taps for predicting the line data L1 and the line data L2 of the field F/o, SD pixels T1 and T2 of the field F/e spatially in the vicinity of pixels of a 525p signal to be generated, SD pixels T3, T4, and T5 of the field F/o spatially in the vicinity of pixels of the 525p signal to be generated, and SD pixels T6 and T7 of the preceding field F-1/e are used. When the line data L1 and the line data L2 of the field F/e are predicted, as shown in FIG. 10, as spatial class taps, SD pixels T1 and T2 of the field F/o spatially in the vicinity of pixels of a 525p signal to be generated, SD pixels T3, T4, and T5 of the field F/e spatially in the vicinity of pixels of the 525p signal to be generated, and SD pixels T6 and T7 of the preceding field F/o are used. In mode 1 for predicting pixels of the line data L1, the SD pixel T7 may not be selected as a class tap. In mode 2 for predicting pixels of the line data L2, the SD pixel T4 may not be selected as a class tap.

As shown in FIGS. 7, 8, 9, and 10, as spatial class taps, in addition to SD pixels at the same vertical position of a plurality of fields, at least one SD pixel in the horizontal direction may be used.

Figure 11:
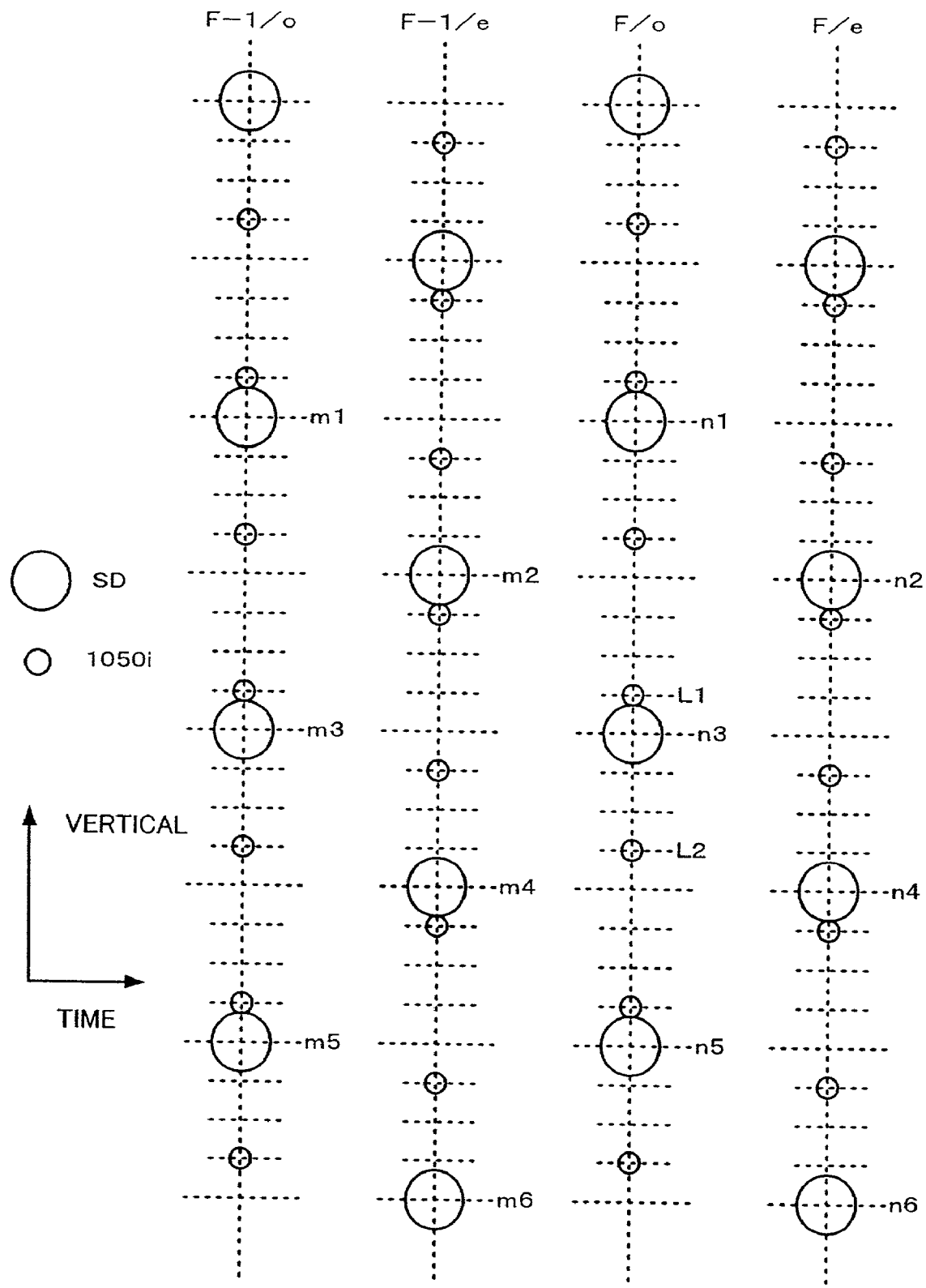
FIG. 11 is a schematic diagram showing the relation between positions of SD pixels and positions of 1050i pixels and an example of motion class taps.
Figure 12:
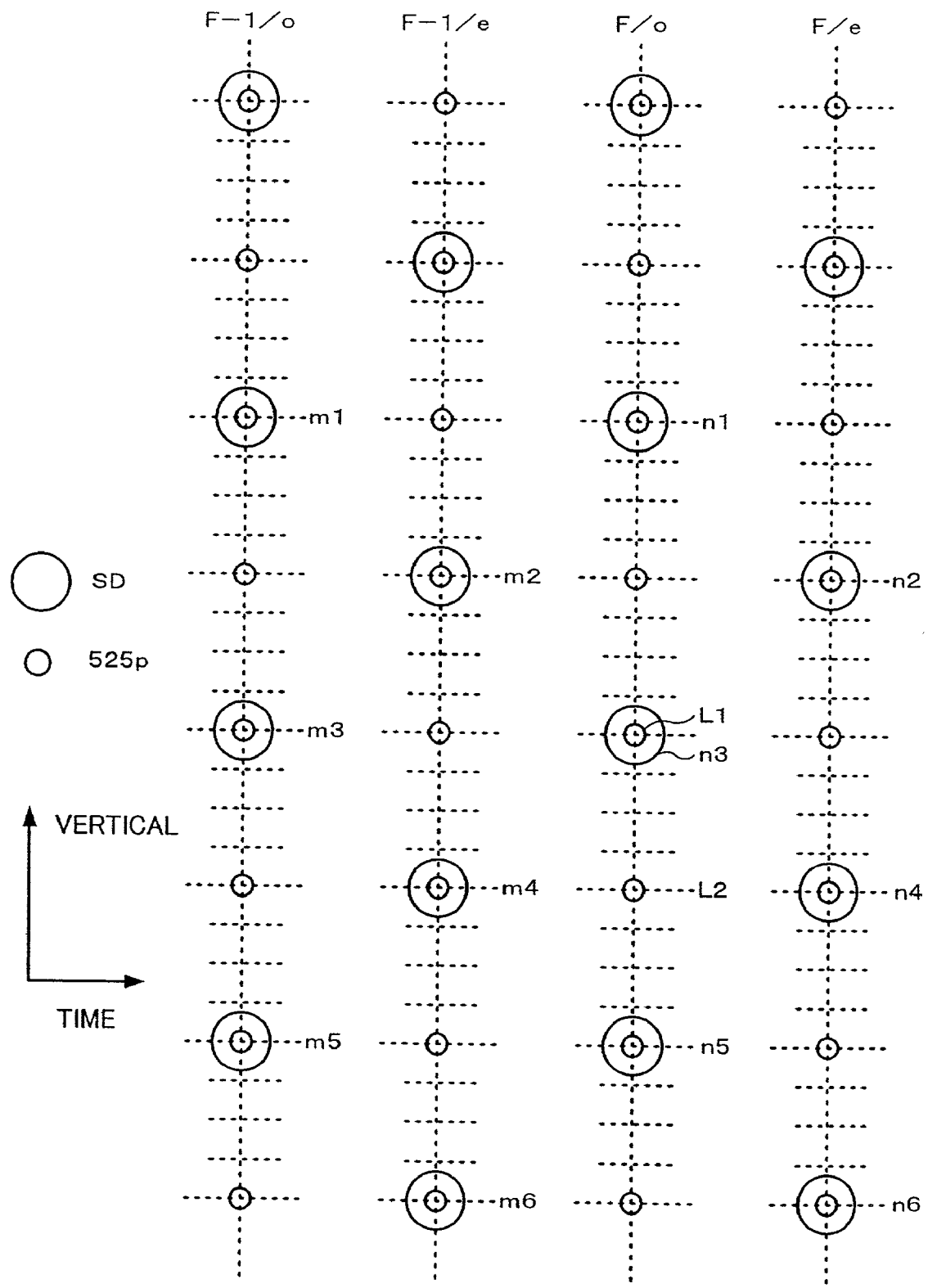
FIG. 12 is a schematic diagram showing the relation between positions of SD pixels and positions of 525p pixels and an example of motion class taps.

FIGS. 11 and 12 show examples of motion class taps selected by the third tap selecting circuit 33. FIG. 11 shows motion class taps in the case that a 525i signal is converted into a 1050i signal. As shown in FIG. 11, as motion class taps for predicting line data L1 and line data L2 of the field F/o, SD pixels n1, n3, and n5 of the field F/o in the vicinity of pixels of a 1025i signal to be generated, SD pixels n2, n4, and n6 of the next field F/e, SD pixels m2, m4, and m6 of the preceding field F-1/e, and SD pixels m1, m3, and m5 of the preceding field F-1/o are used. The vertical position of the SD pixel m1 matches that of the SD pixel n1. The vertical position of the SD pixel m2 matches that of the SD pixel n2. The vertical position of the SD pixel m3 matches that of the SD pixel n3. The vertical position of the SD pixel m4 matches that of the SD pixel n4.

FIG. 12 shows motion class taps used in the case that a 525i signal is converted into a 525p signal. As shown in FIG. 12, as motion class taps for predicting line data L1 and L2 of the field F/o, SD pixels n1, n3, and n5 of the field F/o in the vicinity of pixels of a 525p signal to be generated, SD pixels n2, n4, and n6 of the next field F/e, SD pixels m2, m4, and m6 of the preceding field F-1/e, and SD pixels m1, m3, and m5 of the preceding field F-1/o are used. The vertical position of the SD pixel m1 matches that of the SD pixel n1. The vertical position of the SD pixel m2 matches that of the SD pixel n2. The vertical position of the SD pixel m3 matches that of the SD pixel n3. The vertical position of the SD pixel m4 matches that of the SD pixel n4.

Spatial class taps selected by the first tap selecting circuit 32 are supplied to the spatial class detecting circuit 35. The spatial class detecting circuit 35 detects a pattern of a level distribution of the selected spatial class taps. In this case, the spatial class detecting circuit 35 compresses eight-bit SD data of each pixel to two-bit SD data. For example, the spatial class detecting circuit 35 compresses data of SD pixels as spatial class taps corresponding to ADRC (Adaptive Dynamic Range Coding) method. As information compressing means, another compressing means such as DPCM (predictive encoding method) or VQ (vector quantizing method) may be used instead of the ADRC method.

The ADRC method is an adaptively re-quantizing method developed for a high efficient encoding process for use with a VCR (Video Cassette Recorder). Since the ADRC method allows a local pattern of a signal level to be effectively represented with a short word length, according to the first embodiment of the present invention, the ADRC method is used to generate a spatial class categorization code. In the ADRC method, the length between the maximum value MAX and the minimum value MIN is equally divided by a designated bit length and re-quantized corresponding to the following formula (1).

$$DR = MAX - MIN + 1$$

$$Q = \{(L - MIN + 0.5) \times 2/DR\} \quad (1)$$

where DR represents the dynamic range of spatial class taps; L represents the data level of the pixel of each spacial class tap; Q represents a re-quantized code; and { } represents a truncating process.

Motion class taps selected by the first tap selecting circuit are supplied to the motion class detecting circuit 36. The motion class detecting circuit 36 calculates the average value param of the absolute value of the difference of pixel values at the spatially same position of the motion class taps.

$$param = \frac{\sum_{i=1}^{n} |mi - ni|}{n} \quad (2)$$

where n represents the number of bits assigned.

In the first embodiment, n is 6. By comparing the average value param with a predetermined threshold value, a motion class as a motion index is determined. In the case of (param≦2), the motion class is 0. In the case of (2<param≦4), the motion class is 1. In the case of (4<param≦8), the motion class is 2. In the case of (param>8), the motion class is 3. When the motion class is 0, the motion is minimum (this motion class represents a still picture). As the motion class becomes large, the motion amount becomes large. The determined motion class is supplied to the class combining circuit 37. Alternatively, the motion class may be detected corresponding to a moving vector.

The class combining circuit 37 combines the spatial class received from the spatial class detecting circuit 35 and the motion class received from the motion class detecting circuit 36 and generates a combined class code. The combined class code is supplied as an address to the coefficient memory 38. Coefficient data corresponding to the class code is read from the coefficient memory 38. The motion class is supplied to the register 42. The tap position information is changed corresponding to the motion class.

When an input signal has no motion or a small motion, the motion class detected is 0 or 1. In this case, as shown in FIGS. 7, 8, 9, and 10, spatial class taps are present in two fields. When an input signal has a relatively large motion, the motion class detected is 2 or 3. In this case, spatial class taps are composed of only SD pixels in the same field as a pixel to be generated. In addition, corresponding to the motion class, the tap position information (register 41) of the first class tap selecting circuit 31 may be changed. Thus, corresponding to the motion class, predictive taps may be changed Alternatively, corresponding to the motion class, both predictive taps and spatial class taps may be changed.

By learning the relation between the pattern of a 525i signal and the pattern of a HD signal (a 1050i signal or a 525p signal), obtained coefficient data for each class is stored to the coefficient memory 38. The coefficient data is information for converting a 525i signal into a signal with higher resolution corresponding to a linear estimation expression. The method for obtaining the coefficient data will be described later.

Coefficient data corresponding to class code class is read from the address thereof in the coefficient memory 38. The coefficient data is supplied to the estimation predictive calculating circuit 34. The estimation predictive calculating circuit 34 calculates a liner combination expression (formula (3)) with predictive taps (pixel values) T1, T2, . . . , and T1 received from the first tap selecting circuit 31 and coefficient data w1, w2, . . . , and wi and obtains line data L1. Likewise, the estimation predictive calculating circuit 34 obtains line data L2. It should be noted that coefficient data of the line data L1 is different from coefficient data of the line data L2.

$$L1 = w1T1 + w2T2 + \ldots + wiTi \tag{3}$$

Thus, coefficient data for estimating HD data corresponding to SD data is pre-learnt for each class and stored to the coefficient memory 38. Corresponding to predictive taps and coefficient data, HD data corresponding to SD data is calculated and output. Thus, unlike with an interpolating process for SD data, a picture signal close to real HD data can be obtained.

Figure 13:
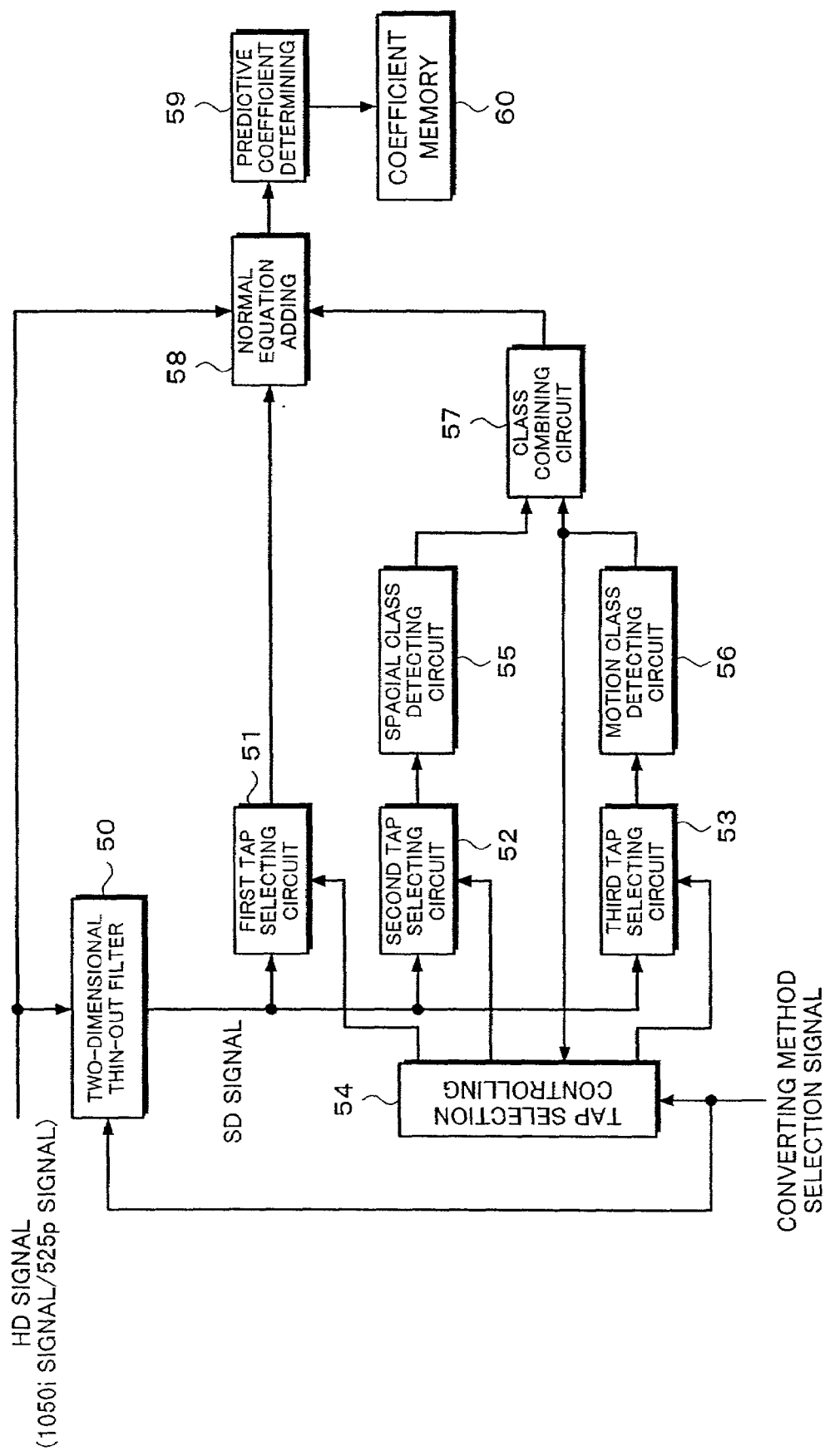
FIG. 13 is a block diagram showing an example of the structure for obtaining coefficient data.

Next, with reference to FIG. 13, a (learning) method for generating coefficient data stored to the coefficient memory will be described. To learn coefficient data, an SD picture corresponding to a known HD picture (a 1050i signal or a 525p signal) is generated by a two-dimensional thin-out filter 50 (in this case, the number of pixels of the SD picture is ¼ that of the HD picture). For example, pixels in the vertical direction of HD data are thinned out by a vertical thin-out filter so that the frequency in the vertical direction of the field is halved. In addition, pixels in the horizontal direction of HD data are thinned out by a horizontal thin-out filter.

An SD signal that is output from the two-dimensional thin-out filter 50 is supplied to a first tap selecting circuit 51, a second tap selecting circuit 52, and a third tap selecting circuit 53. As with the tap selecting circuits 31, 32, and 33 of the signal converting apparatus shown in FIG. 3, the tap selecting circuits 51, 52, and 53 select predictive taps, spatial class taps, and motion taps, respectively. The predictive taps are supplied from the tap selecting circuit 51 to a normal equation adding circuit 55. The spatial class taps are supplied from the tap selecting circuit 52 to a spatial class detecting circuit 55. The motion class taps are supplied from the tap selecting circuit 53 to a motion class detecting circuit 56.

As with the spatial class detecting circuit 35 of the signal converting apparatus, the spatial class detecting circuit 55 compresses dat of the spatial class taps corresponding to the ADRC method and generates a spatial class code. As with the motion class detecting circuit 36 of the signal converting apparatus, the motion class detecting circuit 56 generates a motion class code with the motion class taps. A class combining circuit 57 combines the spatial class code and the motion class code and generates a final class code. The final class code is supplied from the class combining circuit 57 to the normal equation adding circuit 58.

Next, to explain the operation of the normal equation adding circuit 58, a process for learning a conversion expression for converting a plurality of SD pixels into one HD pixel and a signal converting process using a prediction expression thereof will be described. First of all, for explaining the learning process, a predicting process using n pixels will be described. A liner estimation expression with n taps of coeficient data w1, . . . , and wn for each class is given by the formula (4).

$$y = w1 \times 1 + w2 \times 2 + \ldots + wn \times n \tag{4}$$

where x1, x2, . . . , and xn represent levels of SD pixels selected as predictive taps; and y represents the level of an HD pixel.

A plurality of signals of data are learnt for each class. When the number of signals of data is m, the following formula (5) is applied corresponding to the formula (4).

$$yk = w1 \times k1 + k2 + \ldots + wn \times kn \tag{5}$$

where k=1, 2, . . . m.

In the case of m>n, since coefficient data wi, . . . , and wn are not uniquely given, elements of an error vector are defined by the following formula (6). Coefficient data that minimizes the solution of the formula (7) is obtained. In other words, least square method is used.

$$ek = yk - \{w1 \times k1 + w2 \times k2 + \ldots + wn \times kn\}. \tag{6}$$

where k=1, 2, . . . , m.

$$e^2 = \sum_{k=0}^{m} e_k^2 \tag{7}$$

Next, a partial differential coefficient of the formula (7) with respect to wi is obtained. To do that, the coefficients wi are obtained so that the solution of the following formula (8) become "0".

$$\frac{\partial e^2}{\partial w_i} = \sum_{k=0}^{m} 2\left(\frac{\partial e_k}{\partial w_i}\right) e_k = \sum_{k=0}^{m} 2x_{id} \cdot e_k \quad (8)$$

Next, when Xij and Yi are defined as the following formulas (9) and (10), the formula (8) can be represented as a matrix expressed by the following formula (11).

$$X_{ji} = \sum_{p=0}^{m} x_{pi} \cdot x_{pj} \quad (9)$$

$$Y_i = \sum_{k=0}^{m} x_{ki} \cdot y_k \quad (10)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{n1} & x_{n2} & \cdots & x_{nn} \end{bmatrix} \begin{bmatrix} w_1 \\ w_2 \\ \cdots \\ w_n \end{bmatrix} = \begin{bmatrix} Y_1 \\ Y_2 \\ \cdots \\ Y_n \end{bmatrix} \quad (11)$$

The formula (11) is generally referred to as normal equation. The normal equation adding circuit 58 performs the addition of the normal equation with the class code received from the class code combining circuit 57, the predictive taps (SD pixels x1, ..., and xn) received from the tap selecting circuit 51, and the HD pixel y corresponding to the input SD data.

After all data to be learnt has been input, the normal equation adding circuit 58 outputs normal equation data to the predictive coefficient determining circuit 59. The predictive coefficient determining circuit 59 solves the normal equation data with respect to wi using a conventional matrix solution and obtains coefficient data. The predictive coefficient determining circuit 59 writes the obtained predictive coefficient data to a coefficient memory 60.

As the results of the above-described learning process, coefficient data that allows a value that is the statistically closest to the considered HD pixel y to be predicted for each class is stored in the coefficient memory 60. The coefficient data stored in the coefficient memory 60 is loaded to the coefficient memory 38 of the picture signal converting apparatus. Thus, the learning process for generating HD data with SD data corresponding to the linear estimation expression is completed.

In a learning apparatus that obtains the above-described coefficient data, as an input HD signal, a 1050i signal or a 525p signal is used. A conversion method selection signal for selecting one of a 1050i signal and a 525p signal is supplied to the two-dimensional thin-out filter 50 and a tap selection controlling circuit 54. The state of the thin-out process of the two-dimensional thin-out filter 50 is changed corresponding to a conversion method designation signal. The tap selection controlling circuit 54 generates a control signal that causes the first tap selecting circuit 51 to select predictive taps, the second tap selecting circuit 52 to select spatial class taps, and the third tap selecting circuit 53 to select motion class taps. Corresponding to a motion class code, the tap selection controlling circuit 54 selects spatial class taps.

As with the above-described picture signal converting apparatus, corresponding to the scanning line structure (a 1050i signal or a 525p signal) of the output HD signal, the control signal generated by the tap selection controlling circuit 54 causes the first tap selecting circuit 51, the second tap selecting circuit 52, and the third tap selecting circuit 53 to select relevant taps.

Next, a second embodiment of the present invention will be described. In the second embodiment of the present invention, a plurality of field memories are disposed in the line sequential converting circuit 39 of the first embodiment so as to perform a field double speed process along with the line sequential process. Thus, as the scanning line structures of the output picture signals, a 525p signal and/or a 1050i signal and a field double speed 525i signal can be output. With the field double speed process, an output picture signal with a smoother motion can be obtained. In a class categorizing process, a field double speed picture is generated corresponding to a linear estimation expression. Thus, unlike with a process for repeatedly outputting the same field or an interpolating process using an average picture of successive two fields, an output picture can be prevented from becoming unsmooth and deteriorating in resolution.

As with the first embodiment, in the second embodiment, when a signal that sets a scanning line structure designates a field double speed signal, predictive taps, spatial class taps, motion class taps, and coefficient data are selected. In addition, information that designates the field double speed process is supplied to a scanning line structure converting circuit equivalent to the line sequential converting circuit according to the first embodiment.

Figure 14:
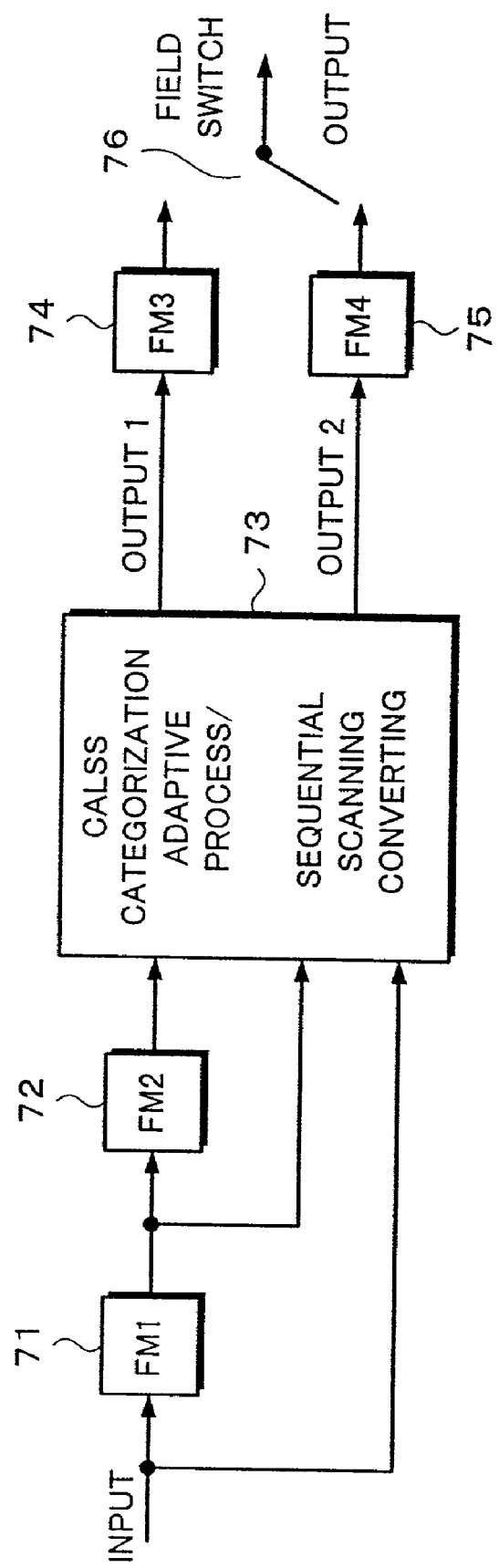
FIG. 14 is a block diagram showing the structure of a second embodiment of the present invention.

FIG. 14 shows an example of the structure of the scanning line structure converting circuit in the case that the field double speed process has been set. In the same process as the first embodiment, a picture signal of which the number of pixels in the horizontal direction is doubled is supplied to field memories 71 and 72 that are connected in series. The field memories 71 and 72 chronologically arrange signals of three successive fields and supply the resultant signal to a class categorization adaptive process/sequential scanning converting circuit 73. The class categorization adaptive process/sequential scanning converting circuit 73 supplies a first output signal and a second output signal to a field memory 74 and a field memory 75, respectively. The field memories 74 and 75 each compress the field period by ½. A field switch 76 selects one of output signals of the field memories 74 and 75 and outputs a field double speed signal.

Figure 15A:
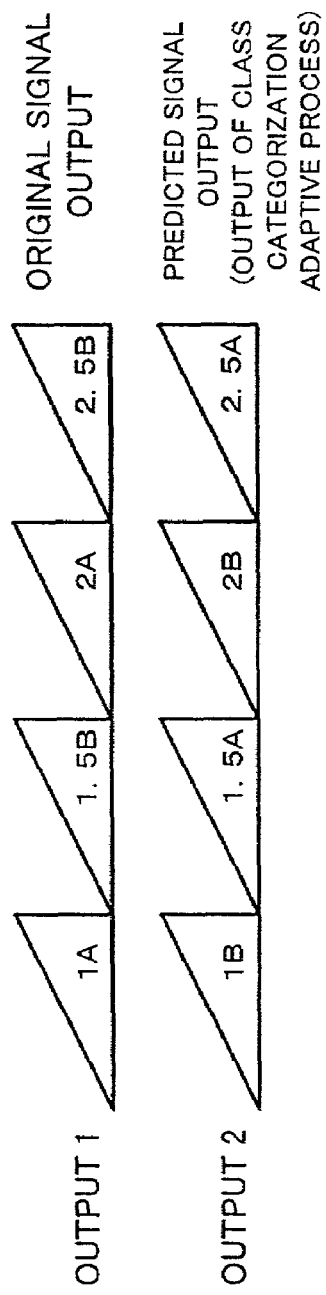
FIGS. 15A, 15B, and 15C are timing charts for explaining a field double speed process according to the second embodiment of the present invention.

The class categorization adaptive process/sequential scanning converting circuit 73 generates two signals as shown in FIG. 15A. In FIG. 15A, each saw tooth waveform represents a signal of one field; A and B represent A field and B field (spatial phases) of a 525i signal; and prefixes (1, 1.5, 2, ...) of A and B represent time periods in the case that the frame period is represented as 1. An input signal that is the same as an output signal 1 is a sequence of fields 1A, 1.5A, 2A, 2.5A, ... and so forth.

Figure 16:
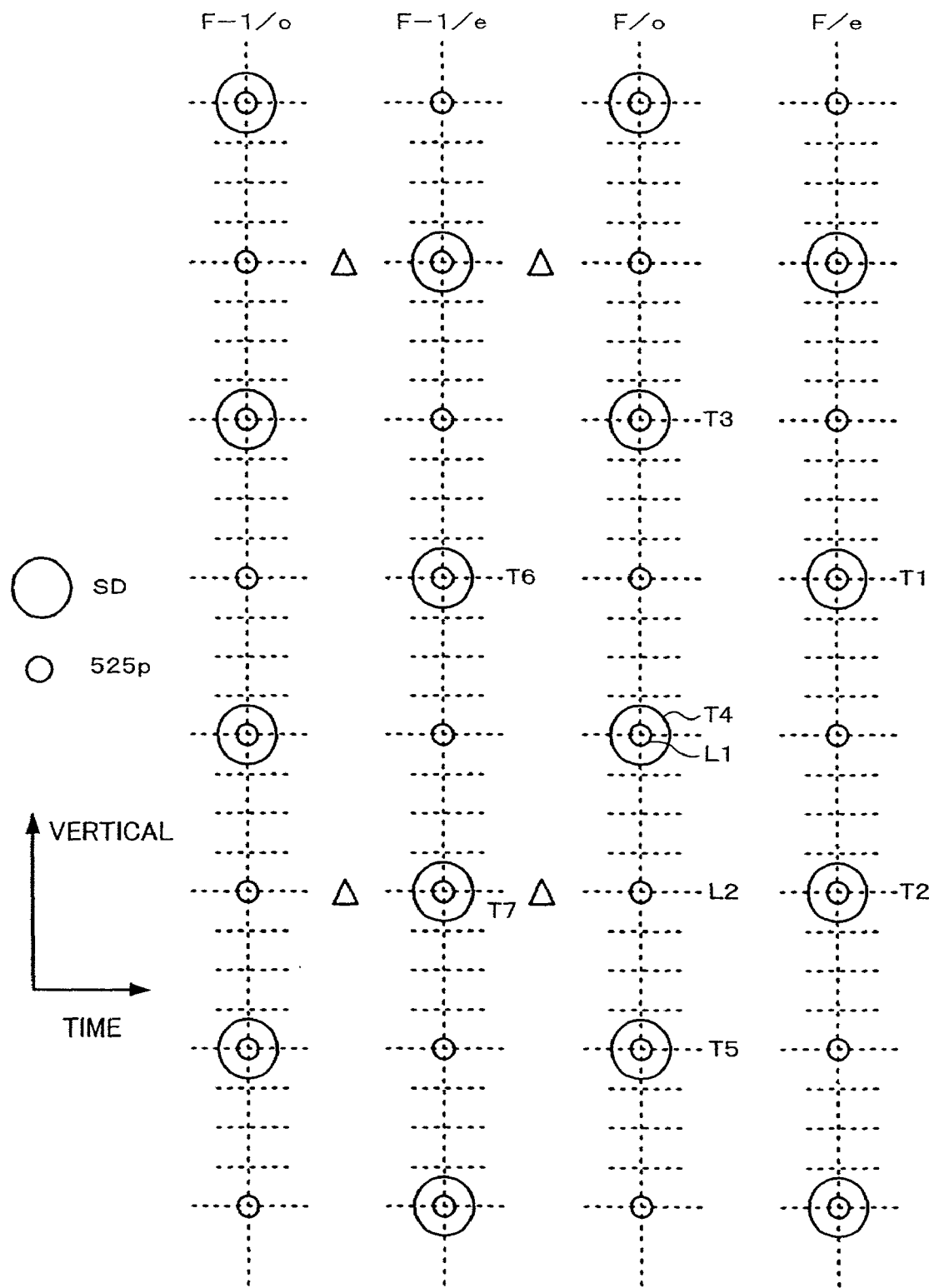
FIG. 16 is a schematic diagram for explaining the field double speed process according to the second embodiment of the present invention.

The class categorization adaptive process/sequential scanning converting circuit 73 generates an output signal 2 that is a sequence of field pictures 1B, 1.5A, 2B, ... that are not contained in the input signal. In FIG. 16, as denoted by triangular pixels, a field picture chronologically present between two fields is generated by the class categorization adaptive process. For example, a field 1B chronologically present between a field 1A and a field 1.5B of the input signal is generated. In addition, a field 1.5B chronologically present between the field 1.5B and a field 2A is generated.

Figure 15B:
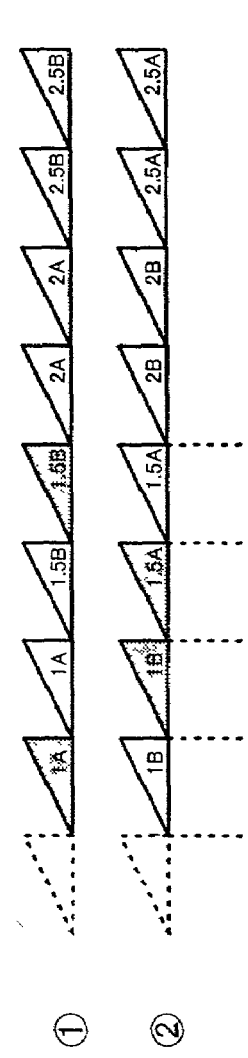
Figure 15C:
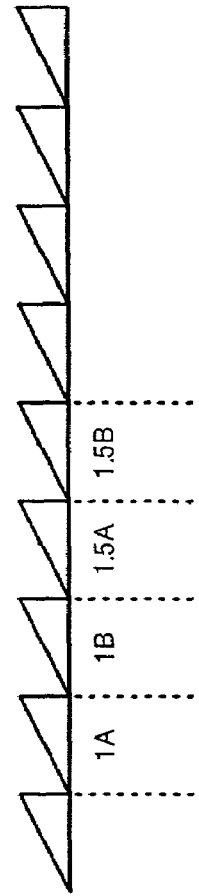

The field memories 74 and 75 double the field speeds of the output signals 1 and 2 of the class categorization adaptive process/sequential scanning converting circuit 73. As shown in FIG. 15B, the field double speed process compresses the field period by ½ and repeatedly outputs the same field. The field switch 76 selects the field double speed signal (1) and the field double speed signal (2) and generates a final output signal. In FIG. 15B, hatched fields represent fields selected by the field switch 76. As shown in FIG. 15C, the field switch 76 outputs fields 1A, 1B, 1.5A, 1.5B, and so forth with half field periods.

In the second embodiment, fields 1B, 1.5A, and so forth are generated by the class categorization adaptive process. However, to more accurately represent chronological variations, fields 1A, 1.17B, 1.33A, 1.5B, and so forth may be output.

Figure 17:
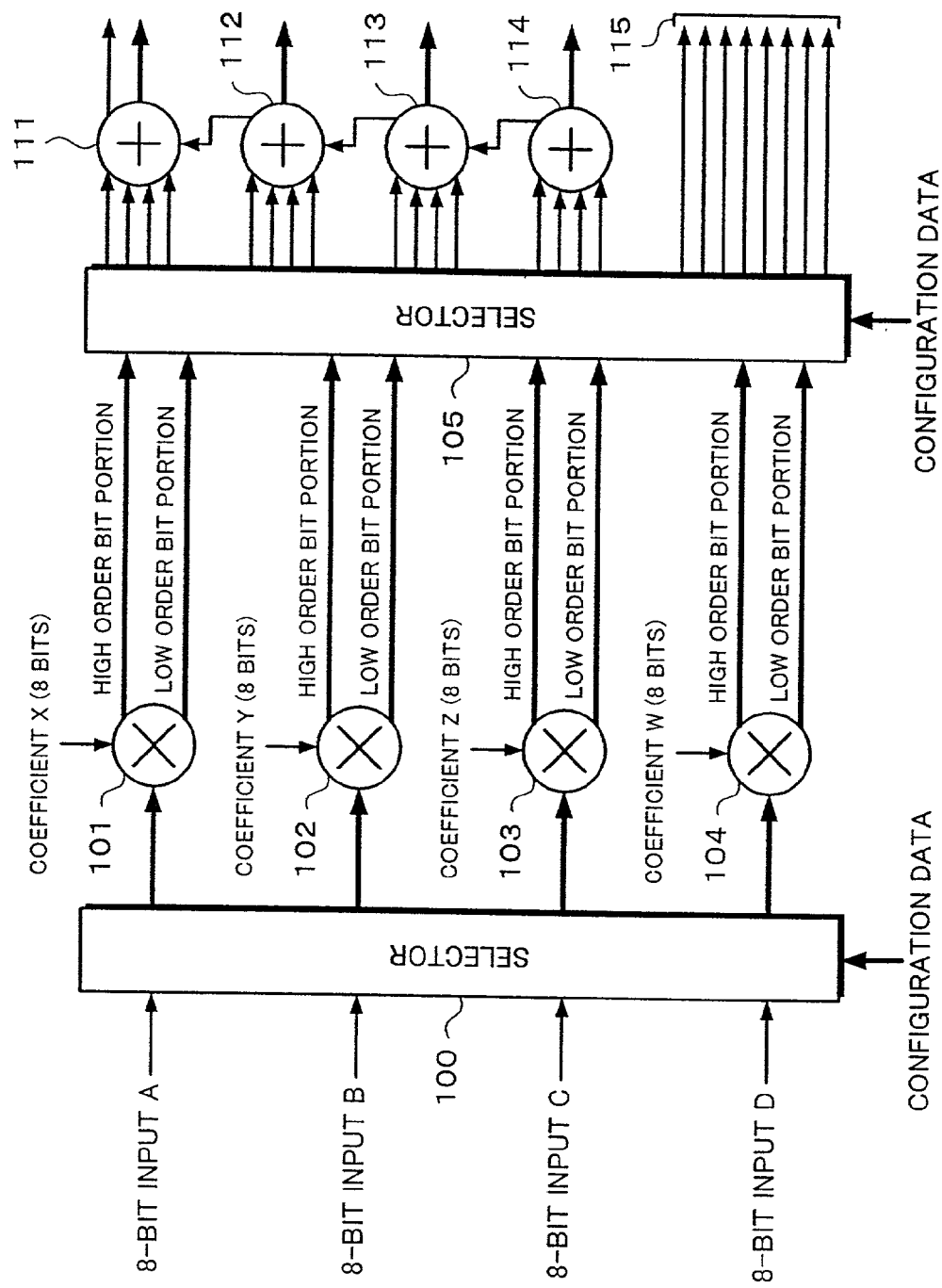
FIG. 17 is a block diagram showing the structure of a third embodiment of the present invention.

FIG. 17 shows the structure of a third embodiment of the present invention. Signals A, B, C, and D with eight bits each are supplied to a selector 100. Output signals corresponding to the signals A, B, C, and D are supplied from the selector 100 to multiplying devices 101, 102, 103, and 104, respectively. The multiplying devices 101, 102, 103, and 104 multiply the output signals of the selector 100 by coefficients X, Y, Z, and W with eight bits each, respectively. The multiplying devices 101 to 104 each output the multiplied result as a high order bit portion and a low order bit portion. The high order bit portions and the low order bit portions of the multiplying devices 101 to 104 are supplied to a selector 105. The selector 105 connects the outputs of the multiplying units 101 to 104 to adding devices 111, 112, 113, and 114. Each of the adding devices 111, 112, 113, and 114 has four inputs.

A carry is supplied from the adding device 114 to the adding device 113. A carry is output from the adding device 113 to the adding device 112. A carry is output from the adding device 112 to the adding device 111. The adding device 111 outputs a carry to the outside. The selector 105 has a function for directly supplying output signals of the multiplying devices 101 to 104 as output signals 115. The selecting operations of the selectors 100 and 105 are designated by configuration data.

FIG. 18 shows a first function accomplished by selectors 100 and 105 corresponding to the configuration data. The selector 100 supplies signals A, B, C, and D to multiplying devices 101, 102, 103, and 104, respectively. The multiplying devices 101, 102, 103, and 104 multiply the signals A, B, C, and D by coefficients X, Y, Z, and W, respectively. The selector 105 directly supplies the output signals of the multiplying units 101 to 104 as signals 115. Thus, the selector 105 outputs four products of A×X, B×Y, C×Z, and D×W.

FIG. 19 shows the structure for accomplishing a second function. A selector 100 supplies the high order bit portions of the multiplied results of multiplying devices 101 to 104 to an adding device 111 and the low order bit portions of the multiplied results of the multiplying devices 101 to 104 to an adding device 112. A selector 105 does not supply data to adding devices 113 and 114. Thus, the adding devices 111 and 112 output A×X+B×Y+C×Z+D×W.

FIG. 20 shows the structure for accomplishing a third function. A 16-bit input signal is divided into a high order eight-bit portion A and a low order eight-bit portion B. The high order bit portion A and the low order bit portion B are supplied to a selector 100. The selector 100 supplies the high order bit portion A to multiplying devices 101 and 103. The selector 100 supplies the low order bit portion B to multiplying devices 102 and 104. A high order eight-bit portion C of a 16-bit coefficient is supplied as the coefficient X to the multiplying device 101. The high order bit portion C is also supplied as the coefficient Y to the multiplying device 102. A low order eight-bit portion D of the 16-bit coefficient is supplied as the coefficient Z to the multiplying device 103. The low order eight bit portion D is also supplied as the coefficient W to the multiplying device 104.

A selector 105 supplies a low order bit portion of the output signal of the multiplying device 104 to one input of an adding device 114. The selector 105 does not supply data to the other three inputs of the adding device 114. The adding device 114 outputs low order eight bits of the product BD. The low order eight bits of the product BD are the low order eight bits of the multiplied result of the 16-bit input data AB and the 16-bit coefficient CD.

The selector 105 supplies a high order bit portion of the output signal of the multiplying device 104 (high order eight bits of the product BD), a low order bit portion of the output signal of the multiplying device 103 (low order eight bits of the product AD), and a low order bit portion of the multiplying device 102 (low order eight bits of the product BC) to an adding device 113. The selector 105 does not supply data to the remaining input of the adding device 113. Thus, the adding device 113 obtains the added result of (high order bit portion of BD+low order bit portion of AD+low order bit portion of BC). The added result is the low order eight bits of the multiplied result of the 16-bit input data AB and the 16-bit coefficient CD.

The selector 105 supplies a high order bit portion of the output signal of the multiplying device 103 (high order eight bits of the product AD), a high order bit portion of the output signal of the multiplying device 102 (high order eight bits of the product BC), and a low order bit portion of the multiplying device 101 (high order eight bits of the product AC) to an adding device 112. The selector 105 does not supply data to the remaining input of the adding device 112. Thus, the adding device 112 outputs the added result of (high order bit portion of AD+high order bit portion of BC+low order bit portion of AC). The added result is the high order eight bits of the multiplied result of the 16-bit input data AB and the 16-bit coefficient CD.

The selector 105 supplies a high order bit portion of the output signal of the multiplying device 101 to one input of the adding device 111. The selector 105 does not supply data to the remaining three inputs of the adding device 111. The adding device 111 outputs high order eight bits of the product AC. The high order eight bits of the product AC are the high order eight bits of the multiplied result of the 16-bit input data AB and the 16-bit coefficient AD. Thus, with the third function, the multiplied result of a 16-bit input signal and a 16-bit coefficient can be output.

According to the present invention, since a plurality of signal processing functions are accomplished by the same circuit, the hardware scale can be reduced in comparison with a structure of which a plurality of circuits are switched over. Moreover, in the picture information converting apparatus according to the present invention, an input picture signal can be converted into a selected one of a plurality of output picture signals with different scanning line structures. For example, when an input picture pattern is a natural picture, the input picture is converted into a 1050i output picture with high picture quality. When an input picture signal is a picture pattern of which a liner flicker is conspicuous, the input picture is converted into a 525p output picture. When a smoothly moving picture is desired, the input picture is converted into a field double speed output picture.

According to the present invention, when picture information is converted, a class is detected corresponding to a plurality of pixels of an input picture signal. With an estimation predictive expression that is optimum in each class, pixel values are generated. Thus, a still picture and a moving picture with higher picture quality than the conventional picture information converting apparatus can be obtained. In addition, since class information contains moving information, the detecting operation and switching operation of a still picture and a moving picture can be omitted. When a picture is switched, the difference of the picture quality can be prevented from becoming large. Thus, picture deterioration due to a motion detection error can be remarkably suppressed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information signal processing apparatus, comprising:
   a signal processing circuit configured with a variable architecture hardware circuit capable of performing a plurality of predetermined processes and performing a selected process from said plurality of predetermined processes on an input information signal;
   a control signal source, disposed outside said signal processing circuit, for supplying a control signal to said signal processing circuit;
   an operation condition setting circuit for generating an operation condition setup signal for said signal processing circuit corresponding to the control signal; and
   a signal varying circuit for varying an operation state of said signal processing circuit corresponding to the control signal, such that the operation state enables the signal processing circuit to perform the selected process from the plurality of predetermined processes by varying hardware of the signal processing circuit.

2. An information signal processing apparatus, comprising:
   a signal processing circuit configured with a variable architecture hardware circuit capable of performing a plurality of predetermined processes and performing a selected process from said plurality of predetermined processes on an input information signal;
   a control signal source, disposed outside said signal processing circuit, for supplying a control signal to said signal processing circuit; and
   an operation condition setting circuit for generating an operation condition setup signal for said signal processing circuit corresponding to the control signal,
   wherein the operation state of said signal processing circuit is varied corresponding to the control signal, and
   wherein said signal processing circuit has at least two processing portions, the operation state of at least one (referred to as designated processing portion) of the processing portions is to be varied corresponding to the operation condition setup signal, and the operation state of the other process portion is to be varied corresponding to the variation of the operation state of the designated process portion, such that the operation state enables the signal processing circuit to perform the selected process from the plurality of predetermined processes.

3. An information signal processing method, comprising:
   selecting and performing a predetermined process from a plurality of processes on an input information signal by a variable architecture hardware circuit capable of performing a plurality of predetermined processes;
   supplying a control signal;
   generating an operation condition setup signal; and
   varying an operation state corresponding to said operation condition setup signal, such that the operation state enables the variable architecture hardware circuit to select and perform the predetermined process from the plurality of processes by varying hardware.

4. The information signal processing method of claim 3, wherein varying hardware includes varying an inner signal path of the variable architecture hardware.

5. The information signal processing method of claim 3, wherein varying hardware includes varying a tap structure of the variable architecture hardware.

6. The information signal processing method of claim 3, wherein varying hardware includes varying calculation process of the variable architecture hardware.

7. The information signal processing method of claim 3, wherein varying hardware includes varying coefficient of sum-of-product calculation of the variable architecture hardware.

8. The information signal processing method of claim 3, wherein generating an operation condition setup signal includes decoding a command corresponding to a user's switch operation within the variable architecture hardware.

9. The information signal processing method of claim 3, wherein generating an operation condition setup signal includes decoding a state sensor output signal within the variable architecture hardware.

10. The information signal processing method of claim 9, wherein the state sensor output signal includes a detected result of the characteristic of an input information signal.

11. The information signal processing method of claim 3, wherein generating an operation condition setup signal includes decoding a signal generated by the variable architecture hardware.

* * * * *